(12) United States Patent
Tetsuka et al.

(10) Patent No.: US 10,718,407 B2
(45) Date of Patent: Jul. 21, 2020

(54) CHAIN BENDING LIMITING ATTACHMENT

(71) Applicant: TSUBAKIMOTO CHAIN CO., Osaka-shi, Osaka (JP)

(72) Inventors: Takayuki Tetsuka, Osaka (JP); Tamaki Shiki, Osaka (JP); Yasunori Ueno, Osaka (JP); Masashi Kunii, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 213 days.

(21) Appl. No.: 15/741,537

(22) PCT Filed: Jul. 25, 2016

(86) PCT No.: PCT/JP2016/071736
§ 371 (c)(1),
(2) Date: Jan. 3, 2018

(87) PCT Pub. No.: WO2017/018381
PCT Pub. Date: Feb. 2, 2017

(65) Prior Publication Data
US 2018/0195581 A1    Jul. 12, 2018

(30) Foreign Application Priority Data

Jul. 29, 2015   (JP) ................................. 2015-149910

(51) Int. Cl.
*F16G 13/16*   (2006.01)
*F16G 13/18*   (2006.01)
(Continued)

(52) U.S. Cl.
CPC ............. *F16G 13/06* (2013.01); *B65G 17/38* (2013.01); *F16G 13/16* (2013.01); *F16G 13/18* (2013.01);
(Continued)

(58) Field of Classification Search
CPC .......... F16G 13/06; F16G 13/18; F16G 13/04; F16G 5/18; B65G 17/38
(Continued)

(56) References Cited

U.S. PATENT DOCUMENTS 4,114,467 A * 9/1978 Petershack ........... B62D 55/202
198/851
4,747,261 A * 5/1988 Frenker-Hackfort ........................
F16G 13/18
198/851

(Continued)

FOREIGN PATENT DOCUMENTS

DE        1119065 A    12/1961
DE        3727839 C2   3/1988
(Continued)

OTHER PUBLICATIONS

International Preliminary Report on Patentability (Fomi PCT/IB/373) issued in counterpart International Application No. PCT/JP2016/071736 dated Jan. 30, 2018, with Form PCT/ISA/237. (6 pages).
(Continued)

*Primary Examiner* — Pradeep C Battula
(74) *Attorney, Agent, or Firm* — Westerman, Hattori, Daniels & Adrian, LLP

(57) ABSTRACT

A chain bending limiting attachment includes first bending limiting members and second bending limiting members. The first and second bending limiting members are detachably attached to a chain to be arranged in a series arrangement direction. Each first bending limiting member includes a first engaging portion. When the chain bends in a first direction, the first engaging portion engages with another first bending limiting member adjacent to the first bending limiting member in the series arrangement direction to limit bending of the chain in the first direction. Each second bending limiting member includes a second engaging por-
(Continued)

tion. When the chain bends in a second direction, the second engaging portion engages with another second bending limiting member adjacent to the second bending limiting member in the series direction to limit bending of the chain in the second direction.

6 Claims, 18 Drawing Sheets

(51) Int. Cl.
  *F16G 13/06* (2006.01)
  *B65G 17/38* (2006.01)
  *H02G 3/04* (2006.01)
  *H02G 11/00* (2006.01)
(52) U.S. Cl.
  CPC ......... *H02G 3/0475* (2013.01); *H02G 11/006* (2013.01)
(58) Field of Classification Search
  USPC ......................................................... 59/78.1
  See application file for complete search history.

(56) References Cited

U.S. PATENT DOCUMENTS

| | | | |
|---|---|---|---|
| 4,854,924 A | 8/1989 | Nagano | |
| 5,042,244 A * | 8/1991 | Worsley | B65G 17/42 198/851 |
| 5,249,415 A * | 10/1993 | Frenker-Hackfort | F16G 13/06 59/78.1 |
| 5,779,583 A | 7/1998 | Nakatani et al. | |
| 6,662,545 B1 * | 12/2003 | Yoshida | B65G 17/065 198/851 |
| 6,945,388 B2 * | 9/2005 | Schumacher | B65G 17/065 198/851 |
| 6,952,916 B1 * | 10/2005 | Fountaine | E05F 11/06 59/5 |
| 9,243,685 B2 * | 1/2016 | Hawkins | E05F 15/684 |
| 2009/0133375 A1 | 5/2009 | Wu | |

FOREIGN PATENT DOCUMENTS

| | | |
|---|---|---|
| GB | 974517 A | 11/1964 |
| JP | 63-32978 U | 3/1988 |
| JP | 6354737 U | 4/1988 |
| JP | 4-93290 U | 8/1992 |
| JP | 5-64559 U | 8/1993 |
| JP | 8-231017 A | 9/1996 |
| JP | 2001-315936 A | 11/2001 |

OTHER PUBLICATIONS

Office Action dated Apr. 16, 2019, issued in counterpart DE Application No. 112016003396.6, with English translation. (10 pages).
International Search Report dated Oct. 25, 2016, issued in counterpart International Application No. PCT/JP2016/071736 (2 pages).
Office Action dated Aug. 27, 2019, issued in counterpart KR Application No. 10-2018-7005118, with English translation. (9 pages).

* cited by examiner

CHAIN BENDING LIMITING ATTACHMENT

BACKGROUND OF THE INVENTION

The present invention relates to a chain bending limiting attachment attached to a chain to limit bending of the chain.

Typical chains include link plates rotationally coupled to each other in series. Such a chain may be provided with a bending restricting means that restricts the bending degree of the chain (for example, see Patent Document 1). The bending restricting means includes a pin, which projects from the outer surface of each inner link plate, and an elongated hole, which is famed in each outer link plate. The elongated hole extends in an arcuate manner to a certain length.

When each pin and the associated elongated hole are engaged, the pin is allowed to move only by the length of the elongated hole. Thus, the swinging angle of each inner link plate with respect to the associated outer link plate is kept within a certain angle. As a result, the bending limit of the chain is set.

PRIOR ART DOCUMENT

Patent Document

Patent Document 1: Japanese Laid-Open Utility Model Publication No. 4-93290

SUMMARY OF THE INVENTION

In the above-described chain, the pin and the elongated hole, which constitute the bending restricting means, are formed integrally with the inner link plate and the outer link plate. Thus, the inner link plates and the outer link plates need to be fabricated anew in order to change the bending limit of the chain. This chain is therefore less versatile.

The present invention focuses on such a problem of the conventional technology. Accordingly, it is an objective of the present invention to provide a chain bending limiting attachment that increases the versatility of the chain.

Means and operational advantages for solving the above-described problem will now be described.

A chain bending limiting attachment that solves the above-described problem is attached to a chain, which is formed by rotationally coupling links in series. The links include pairs of links rotationally coupled to each other. The chain bending limiting attachment limits a rotational range of the pairs of links with each other to limit bending of the chain. The chain bending limiting attachment includes bending limiting members detachably attached to the chain to be arranged in a series arrangement direction of the chain. Each of the bending limiting members includes a first engaging portion and a second engaging portion. When the chain bends in a first direction in a direction intersecting with the series arrangement direction, the first engaging portion engages with another bending limiting member that is adjacent in the series arrangement direction to limit bending of the chain in the first direction. When the chain bends in a second direction, which is opposite to the first direction, the second engaging portion engages with another bending limiting member that is adjacent in the series arrangement direction to limit bending of the chain in the second direction.

With this configuration, since the bending limit of the chain is changed by replacing the bending limiting members, the versatility of the chain is increased.

In the above-described chain bending limiting attachment, each of the bending limiting members preferably includes a first bending limiting member and a second bending limiting member. The first bending limiting member preferably includes the first engaging portion. The second bending limiting member preferably includes the second engaging portion. When the first engaging portion of each first bending limiting member engages with the first engaging portion of another first bending limiting member that is adjacent in the series arrangement direction, the first bending limiting members preferably limit bending of the chain in the first direction. When the second engaging portion of each second bending limiting member engages with the second engaging portion of another second bending limiting member that is adjacent in the series arrangement direction, the second bending limiting members preferably limit bending of the chain in the second direction.

With this configuration, the first bending limiting members, which include the first engaging portion, and the second bending limiting members, which include the second engaging portion, are separate members. Thus, the first bending limiting members and the second bending limiting members can be replaced separately. Thus, the bending limit of the chain in the first direction and the bending limit of the chain in the second direction can be changed separately.

In the above-described chain bending limiting attachment, the chain preferably includes the pairs of links, pins, and tubular bushings. The pins and the bushings preferably rotationally couple the two links in each pair with each other. Each pin is preferably inserted into the corresponding one of the bushings. Each first bending limiting member preferably includes a pair of first arms, which hold two bushings that are adjacent to each other in the series arrangement direction from opposite sides in the series arrangement direction when the first bending limiting member is attached to the chain. Each second bending limiting member preferably includes a pair of second arms, which hold two bushings that are adjacent to each other in the series arrangement direction from opposite sides in the series arrangement direction when the second bending limiting member is attached to the chain.

With this configuration, the first bending limiting members and the second bending limiting members can be easily attached to the chain in a stable manner.

In the above-described chain bending limiting attachment, the two bushings that are held between the pair of first arms of one of the first bending limiting members and the two bushings that are held between the pair of second aims of the corresponding one of the second bending limiting members preferably include one bushing in common.

This configuration allows a greater number of the first bending limiting members and the second bending limiting members to be attached to the chain.

In the above-described chain bending limiting attachment, each first bending limiting member preferably includes a first insertion section, which is formed between the pair of first arms. The first insertion section preferably receives one of the two second arms of one of the two second bending limiting members that are adjacent to each other in the series arrangement direction and one of the two second arms of the other one of the second bending limiting members. Each second bending limiting member preferably includes a second insertion section, which is formed between the pair of second arms. The second insertion section preferably receives one of the two first arms of one of the two first bending limiting members that are adjacent to each other in the series arrangement direction and one of the two first arms of the other one of the first bending limiting members.

This configuration ensures sufficient lengths of the first arms and the second arms.

In the above-described chain bending limiting attachment, the chain preferably includes the pairs of links, pins, and tubular bushings. The pins and the bushings preferably rotationally couple the two links in each pair with each other. Each pin is preferably inserted into the corresponding one of the bushings. Each first bending limiting member preferably includes a first fitting portion, which is fitted between two bushings that are adjacent to each other in the series arrangement direction when the first bending limiting member is attached to the chain. Each second bending limiting member preferably includes a second fitting portion, which is fitted between two bushings that are adjacent to each other in the series arrangement direction when the second bending limiting member is attached to the chain.

This configuration allows the first bending limiting members and the second bending limiting members to be attached to the chain in a stable manner.

In the above-described chain bending limiting attachment, the bending limiting members preferably restrict the chain from bending further in the first direction from a straight position and preferably permit the chain to bend in the second direction until a bending radius of the chain reaches a predetermined bending radius.

In the above-described chain bending limiting attachment, the first bending limiting members preferably restrict the chain from bending further in the first direction from a straight position. The second bending limiting members preferably permit the chain to bend in the second direction until a bending radius of the chain reaches a predetermined bending radius.

For example, when the movable body is used in such a manner that the movable body reciprocates in the horizontal direction with one end of the chain foaming a curved section being secured to a fixing portion, and the other end of the chain being secured to the movable body located above the fixing portion, the above configuration stabilizes the path of the chain that reciprocates in accordance with the reciprocating movement of the movable body.

In the above-described chain bending limiting attachment, each of the bending limiting members preferably includes a first bending limiting member, which includes the first engaging portion, and a second bending limiting member, which includes the second engaging portion. The first bending limiting members and the second bending limiting members are preferably alternately arranged in the series arrangement direction. When the first engaging portion of each first bending limiting member engages with the second bending limiting member that is adjacent in the series arrangement direction, the first bending limiting member preferably limits bending of the chain in the first direction. When the second engaging portion of each second bending limiting member engages with the first bending limiting member that is adjacent in the series arrangement direction, the second bending limiting member preferably limits bending of the chain in the second direction.

With this configuration, the first bending limiting members, which include the first engaging portion, and the second bending limiting members, which include the second engaging portion, are separate members. Thus, the first bending limiting members and the second bending limiting members can be replaced separately. Thus, the bending limit of the chain in the first direction and the bending limit of the chain in the second direction can be changed separately.

The present invention increases the versatility of the chain.

DETAILED DESCRIPTION OF THE PREFERED EMBODIMENTS

First Embodiment

Hereinafter, a chain bending limiting attachment according to a first embodiment will be described with reference to the drawings. The chain bending limiting attachment is attached to a chain, and the chain is used as an articulated support member of a long object guide device.

Figure 1:
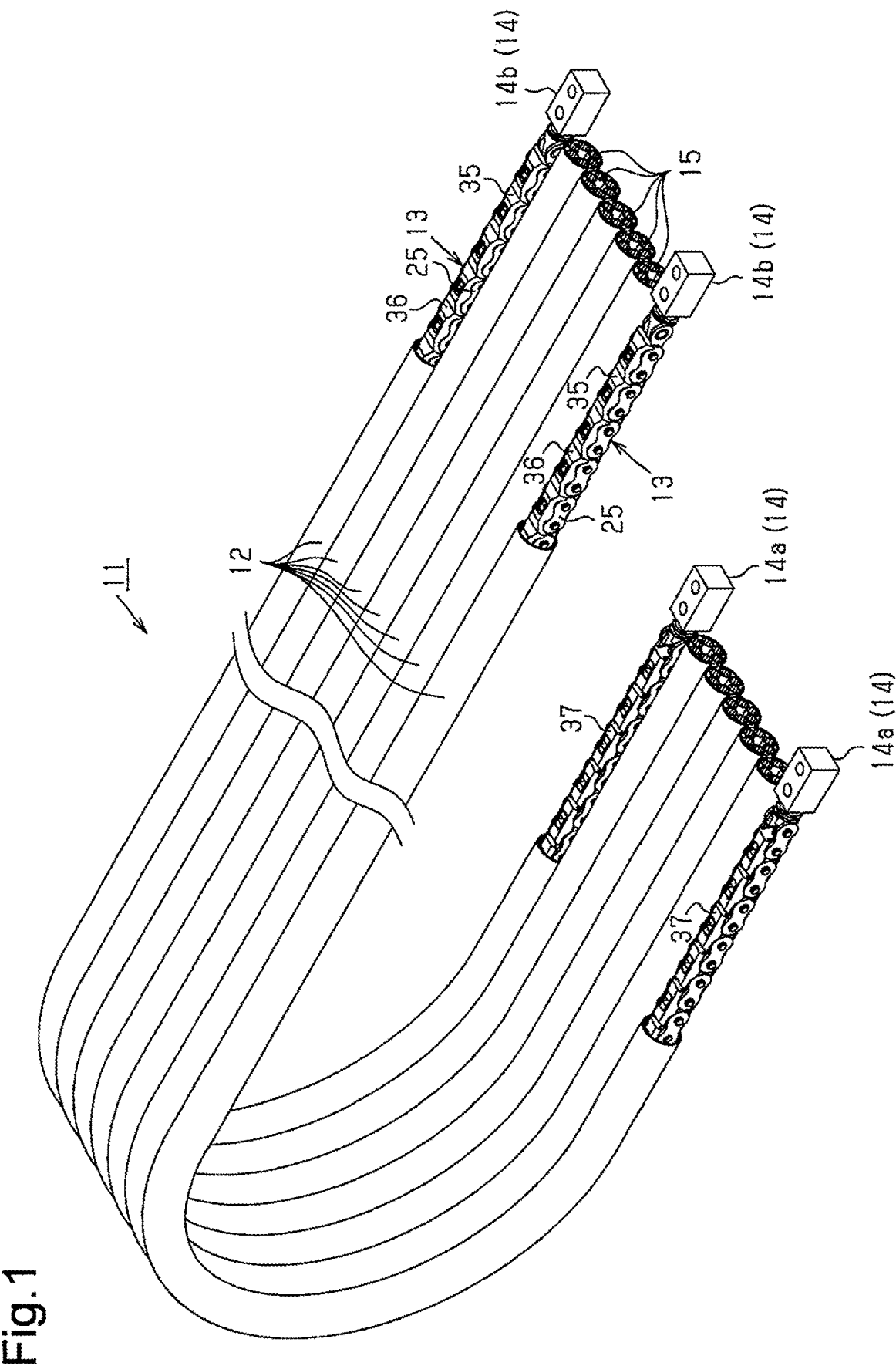
FIG. 1 is a partially cutaway perspective view of a long object guide device according to a first embodiment.
Figure 2:
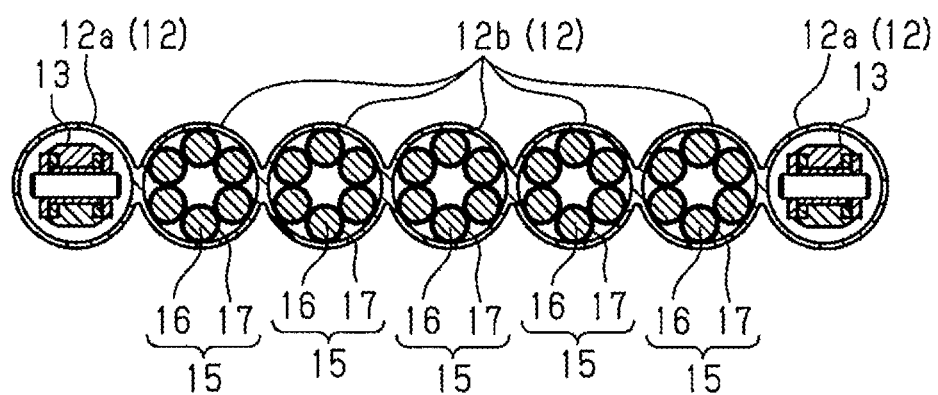
FIG. 2 is an end view of the long object guide device of FIG. 1.

As shown in FIGS. 1 and 2, a long object guide device 11 includes flexible tubular members 12, which is made of synthetic plastic, long articulated support members 13, each inserted into a tubular member 12, and fixation members 14, which are coupled to the opposite ends of the articulated support members 13 in the longitudinal direction. The present embodiment includes seven tubular members 12 and two articulated support members 13. The seven tubular members 12, each having the shape of a long tube, are coupled to each other or formed integrally to form the shape of a strip.

Of the seven tubular members 12, the two tubular members 12 at the opposite ends each receive an articulated support member 13. Of the seven tubular members 12, the remaining five tubular members 12 other than the two tubular members 12 at the opposite ends each receive covered wires 15, which serve as flexible long objects. The tubular members 12 into which the articulated support members 13 are inserted are referred to as first tubular members 12a, and the tubular members 12 into which the covered wires 15 are inserted are referred to as second tubular members 12b. The seven tubular members 12 of the present embodiment include two first tubular members 12a and five second tubular members 12b. In the present embodiment, six covered wires 15 are inserted into each second tubular member 12b. Each covered wire 15 is formed by covering a wire 16 with an insulator 17.

Figure 3:
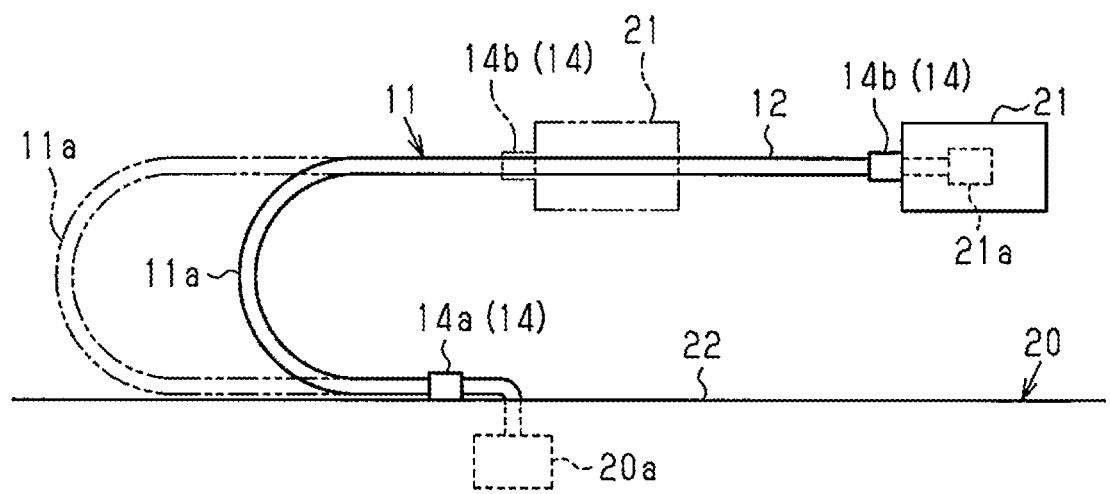
FIG. 3 is a side view schematically showing a state in which the long object guide device of FIG. 1 is used.

As shown in FIG. 3, the covered wires 15 are used to supply power to a movable member 21 from a power source 20a of equipment 20. The movable member 21 is a movable component of the equipment 20. The long object guide device 11 is used to protect and guide the covered wires 15. The two fixation members 14 that are located on the fixed end of the long object guide device 11 are referred to as first fixation members 14a and fixed to a predetermined position of an attachment surface 22 of the equipment 20, which is substantially parallel to the movement path of the movable member 21, for example. The two fixation members 14 that are located on the movable end of the long object guide device 11 are referred to as second fixation members 14b and fixed to the movable member 21.

The sections of the covered wires 15 in the second tubular members 12b that extend outward beyond the first fixation members 14a are connected to the feed terminal of the power source 20a in the equipment 20. The sections of the covered wires 15 in the second tubular members 12b that extend outward beyond the second fixation members 14b are connected to the receiving terminal of an electric device 21a in the movable member 21. The covered wires 15 thus supply the necessary power to the electric device 21a in the movable member 21 from the power source 20a in the equipment 20.

The section of the long object guide device 11 between the first fixation members 14a and the second fixation members 14b extends from the fixed end away from the movable end in the movable direction of the movable member 21, forms a semicircular curved section 11a, and then extends in the reversed direction. The section of the long object guide device 11 extending from the curved section 11a to the movable end is suspended in the air and extended substantially linearly in the moving direction of the movable member 21.

The long object guide device 11 protects and guides the covered wires 15, which are inserted into the second tubular members 12b (see FIG. 1), in accordance with the reciprocating movement of the movable member 21, to which the second fixation members 14b are fixed. The curved section 11a of the long object guide device 11 reciprocates in accordance with the reciprocating movement of the movable member 21.

Figure 4:
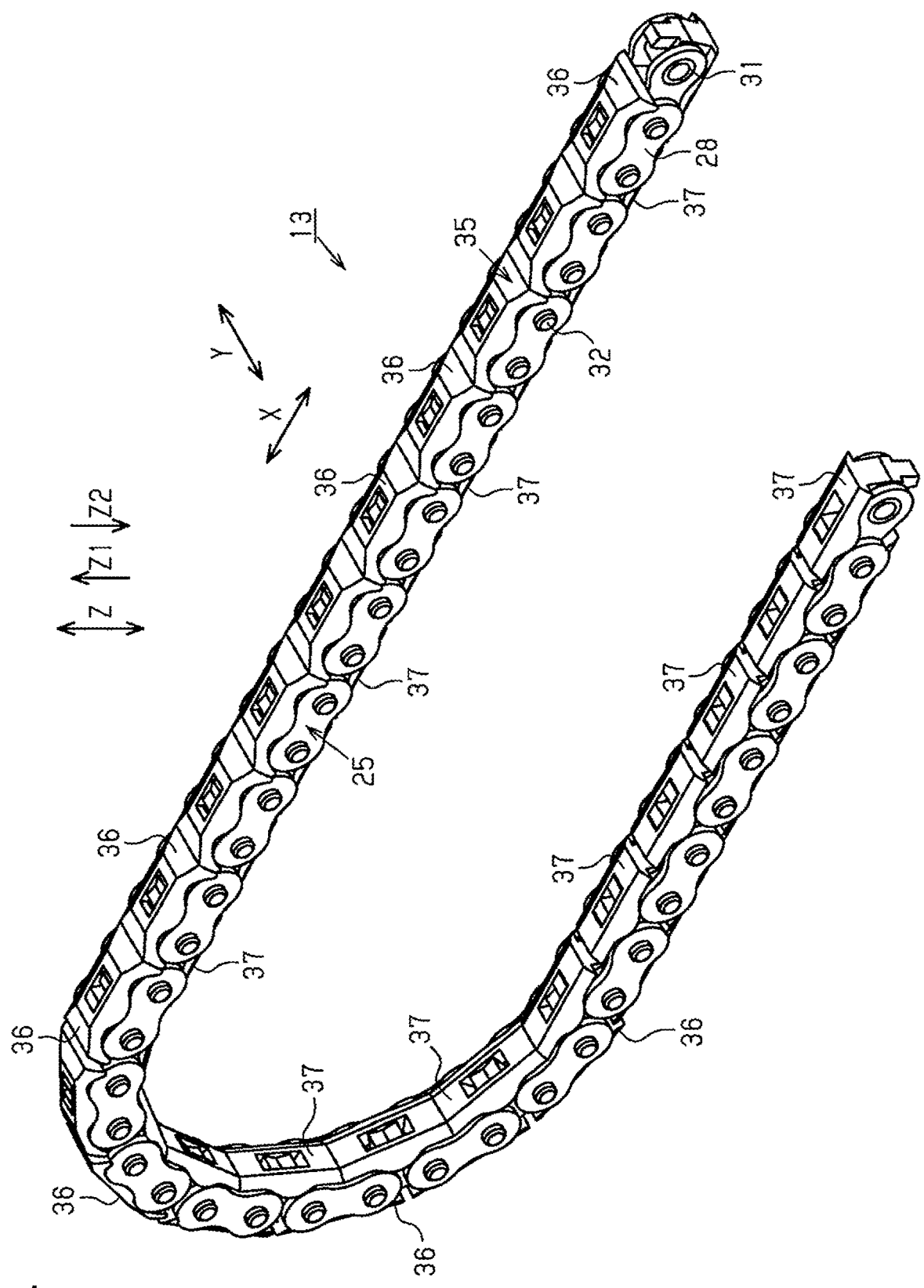
FIG. 4 is a perspective view showing an articulated support member of the long object guide device of FIG. 1.

As shown in FIG. 4, the articulated support member 13 includes a chain 25 and a chain bending limiting attachment 35. The chain bending limiting attachment 35 is attached to the chain 25 and limits bending of the chain 25. In the present embodiment, the chain 25 is made of, for example, metal such as stainless-steel, and the bending limiting attachment 35 is made of synthetic plastic.

Figure 5:
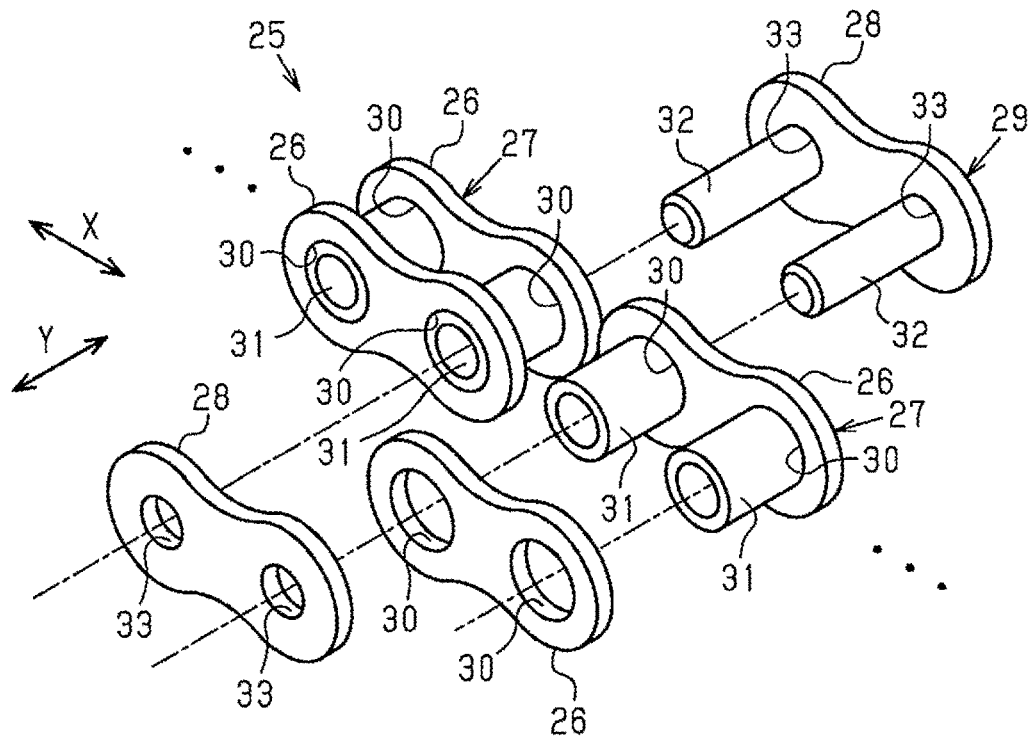
FIG. 5 is an exploded perspective view of the chain of the articulated support member of FIG. 4.
Figure 6:
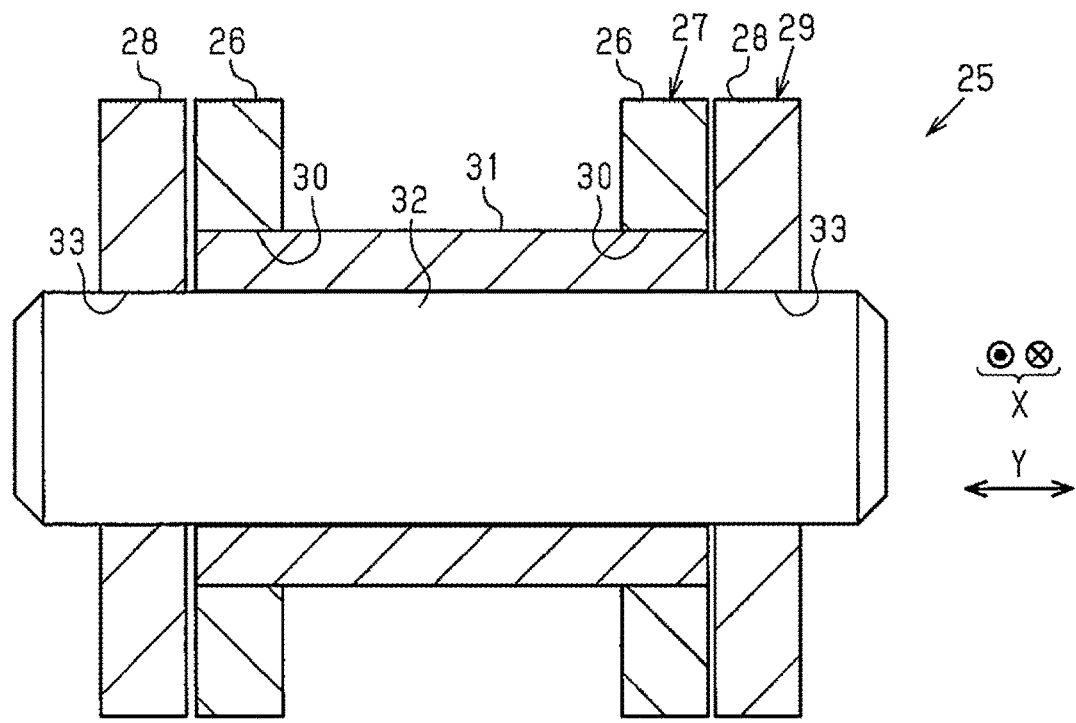
FIG. 6 is a cross-sectional view of the chain of FIG. 5.

As shown in FIGS. 5 and 6, the chain 25 includes inner links 27 and outer links 29. Each inner link 27 includes two inner link plates 26, which face each other in the width direction Y. Each outer link 29 includes two outer link plates 28, which face each other in the width direction Y.

The distance between the two facing inner link plates 26 of each inner link 27 is set to be less than the distance between the two facing outer link plates 28 of each outer link 29. That is, the distance between the two outer link plates 28 of each outer link 29 is set to be greater than the distance between the two inner link plates 26 of each inner link 27. The inner links 27 and the outer links 29 are alternately arranged, and the ends of the inner links 27 and the outer links 29 that are adjacent to each other in a series arrangement direction X are rotationally coupled to each other. In this manner, the chain 25 is formed to have a predetermined length.

The inner link plates 26 and the outer link plates 28 are rounded plates and extend in the series arrangement direction X. The central portion of each inner link plate 26 and each outer link plate 28 in the series arrangement direction X is narrowed. The series arrangement direction X coincides with the movable direction of the chain 25 when the chain 25 is pulled from one end in the longitudinal direction. The inner link plates 26 and the outer link plates 28 are arranged parallel to each other.

Thus, the chain 25 of the present embodiment is configured in such a manner that the distances between the inner link plates 26 at the first end and the second end of each inner link 27 in the series arrangement direction X are equal to each other, and the distances between the outer link plates 28 at the first end and the second end of each outer link 29 are equal to each other. That is, the chain 25 of the present embodiment is a flat chain.

Circular first insertion holes 30 are formed on opposite ends of each inner link plate 26 and extend through the inner link plate 26 in the width direction Y. The width direction Y coincides with the thickness direction of the inner link plates 26. Cylindrical bushings 31 are mounted between the two facing inner link plates 26 of each inner link 27 to keep the distance between the inner link plates 26. The opposite ends of each bushing 31 are fitted in the first insertion holes 30 of the inner link plates 26 to extend between the two facing inner link plates 26.

Circular second insertion holes 33 are famed on opposite ends of each outer link plate 28 and extend through the outer link plate 28 in the width direction Y. The width direction Y also coincides with the thickness direction of the outer link plates 28. Each second insertion hole 33 is capable of receiving a columnar pin 32. The columnar pin 32 has an outer diameter slightly smaller than the inner diameter of the bushing 31. Each inner link 27 is famed by mounting two bushings 31 between the two inner link plates 26. The outer link plates 28 of each outer link 29 are rotationally coupled to the inner link plates 26 of the associated inner links 27 via the pins 32 from the outside of the inner link plates 26 of the inner links 27.

In this case, the middle portion of each pin 32 is rotationally inserted into the associated bushing 31 mounted between the two inner link plates 26 of the inner link 27. The opposite ends of each pin 32 are fitted in the second insertion holes 33 of the outer link plates 28 of the outer link 29. That is, the opposite ends of each pin 32 are fitted to the pair of outer link plates 28 at the second insertion holes 33.

Thus, the chain 25 is formed by rotationally coupling the two inner link plates 26 of the inner links 27 that are adjacent to each other in the series arrangement direction X and the two outer link plates 28 of the associated outer link 29 at the corresponding ends in the arrangement direction X via the pins 32 and the bushings 31. That is, the chain 25 is formed by rotationally coupling the inner links 27 and the outer links 29, which are alternately arranged, in series with the pins 32 and the bushings 31.

Figure 7:
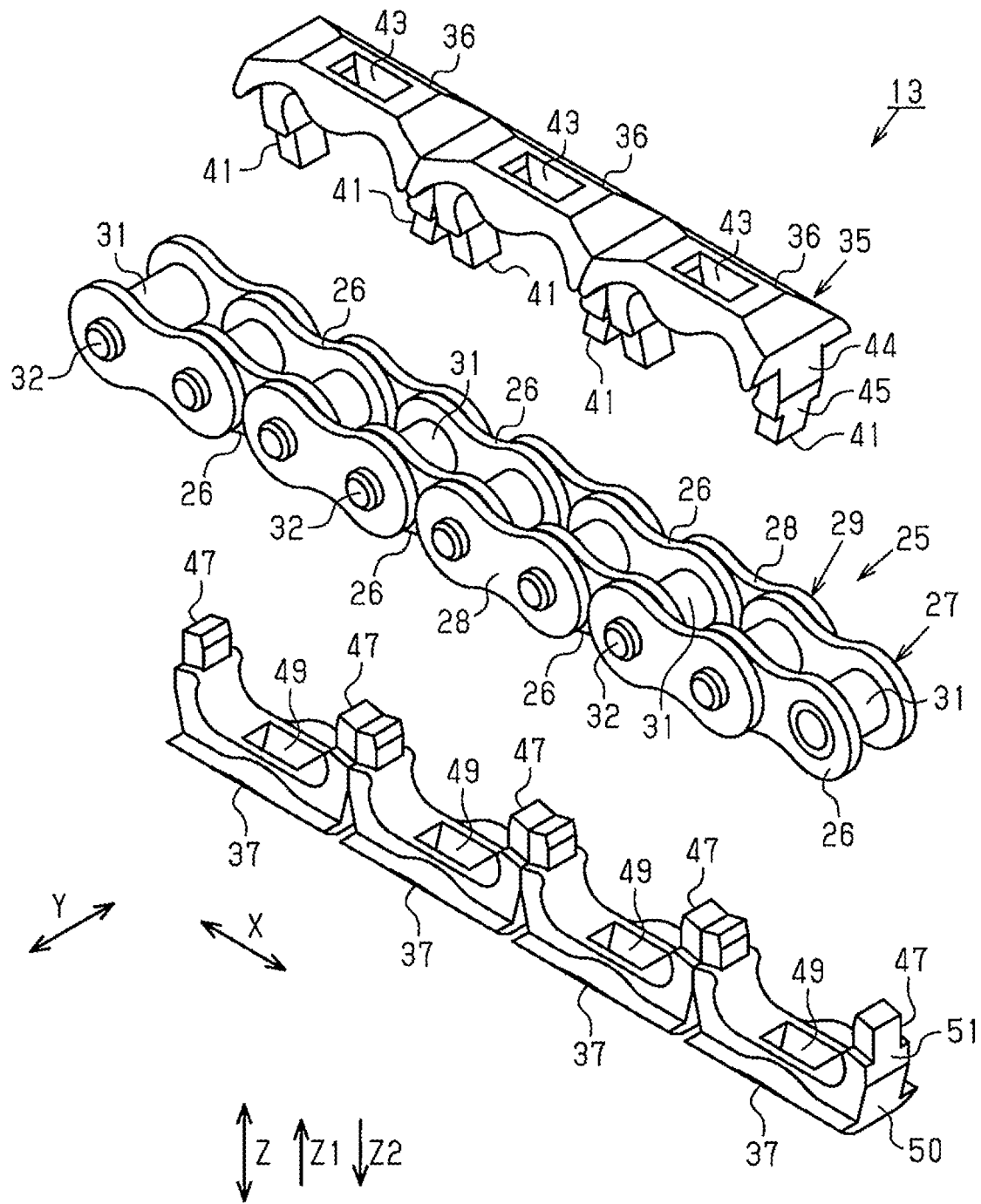
FIG. 7 is an exploded perspective view of the articulated support member of FIG. 4.

As shown in FIGS. 4 and 7, the chain bending limiting attachment 35 includes first bending limiting members 36 and second bending limiting members 37. The first bending limiting members 36 and the second bending limiting members 37 are detachably attached to the chain 25 to be arranged in the longitudinal direction of the chain 25. The longitudinal direction of the chain 25 coincides with the series arrangement direction X. The first bending limiting members 36 and the second bending limiting members 37 configure bending limiting members.

The section of the chain 25 that extends straight is referred to as a straight section. The first bending limiting members 36 are attached to the straight section of the chain 25 on the side facing in a first direction Z1 of a height direction Z (upper side in FIG. 7). The height direction Z corresponds to a direction that intersects with both the series arrangement direction X and the width direction Y, and the first direction Z1 corresponds to one direction of the height direction Z. In the present embodiment, the height direction Z corresponds to a direction orthogonal to both the series arrangement direction X and the width direction Y. The second bending limiting members 37 are attached to the straight section of the chain 25 on the side facing in a second direction Z2 opposite to the first direction Z1 (lower side in FIG. 7). That is, the second direction Z2 corresponds to the other direction of the height direction Z.

Figure 8:
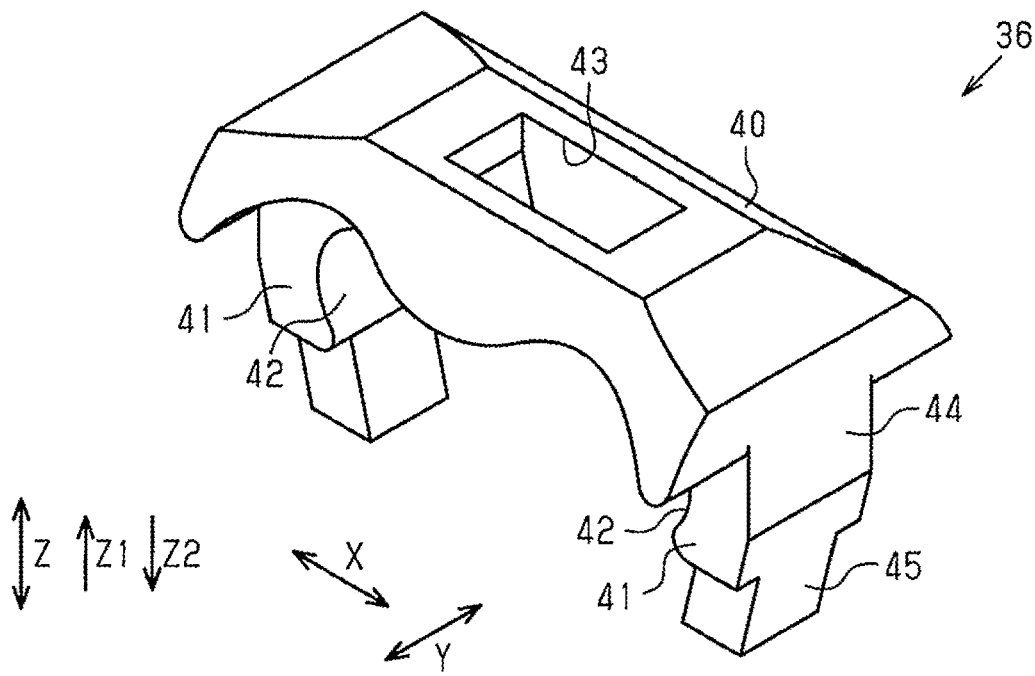
FIG. 8 is a perspective view of the first bending limiting member of the articulated support member of FIG. 4.
Figure 10:
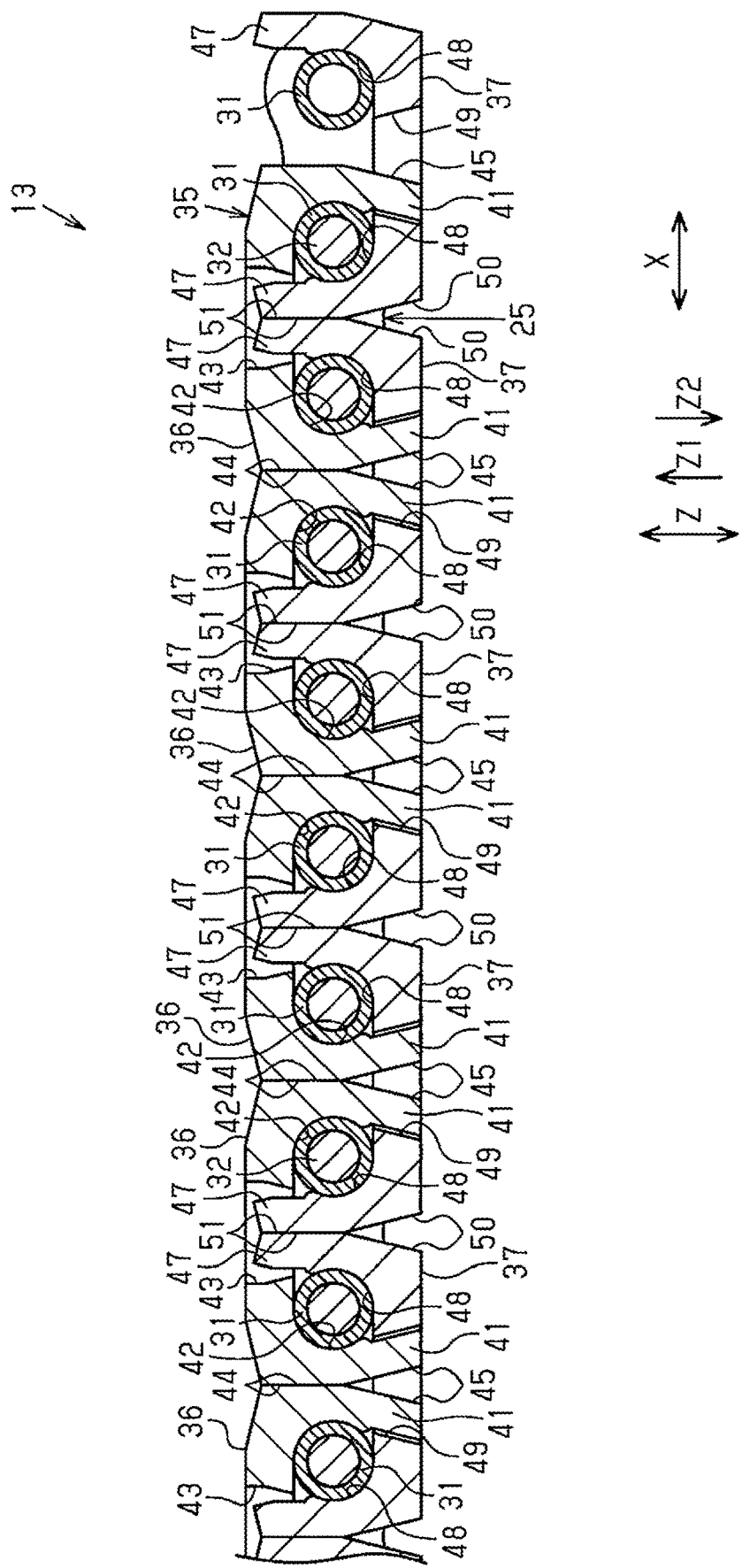
FIG. 10 is a cross-sectional view showing the straight position of the articulated support member of FIG. 4.

As shown in FIGS. 8 and 10, each first bending limiting member 36 includes a first main body 40 and a pair of first arms 41. The first main body 40 has the shape of a substantially rectangular plate extending in the series arrangement direction X. The pair of first arms 41 are located at the opposite ends of the first main body 40 in the series arrangement direction X on the surface facing in the second direction Z2. The pair of first arms 41 protrude from the central portions of the opposite ends in the width direction Y to extend in the second direction Z2. The sections of the pair of first arms 41 closer to the distal ends than the central portions in the height direction Z (the section toward the second direction Z2) are slightly tilted inward.

A first arcuate surface 42 is famed on the inner side of the proximal end of each of the pair of first arms 41. The first arcuate surface 42 corresponds to the outer circumferential surface of each bushing 31. When the first bending limiting member 36 is attached to the chain 25, the pair of first arms 41 hold two bushings 31 that are adjacent to each other in the series arrangement direction X with the first arcuate surfaces 42 from the opposite sides in the series arrangement direction X. A first through-hole 43 is formed at the central portion of the first main body 40 between the pair of first arms 41. The first through-hole 43 extends through the first main body 40 in the height direction Z. The first through-hole 43 serves as a first insertion section.

The opposite outer surfaces of the first bending limiting member 36 in the series arrangement direction X each include a first engaging portion 44 and a first contact portion 45. The first engaging portion 44 is T-shaped and configures the half part of the outer surface toward the first direction Z1. The first contact portion 45 is T-shaped and configures the half part of the outer surface toward the second direction Z2. The first engaging portion 44 is parallel to both the width direction Y and the height direction Z. The first contact portion 45 is parallel to the width direction Y and is slightly tilted inward with respect to the height direction Z.

Figure 9:
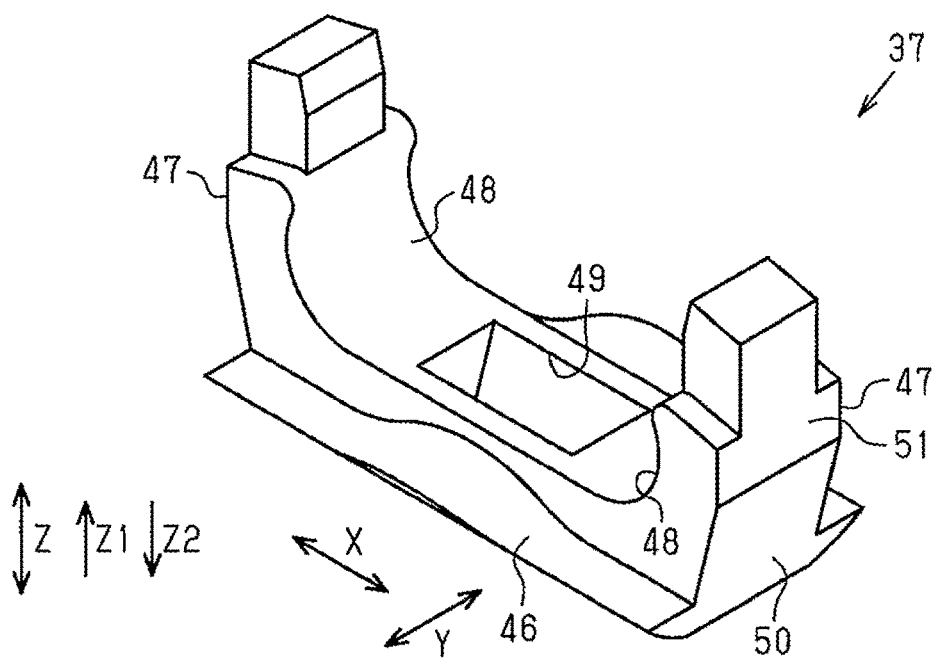
FIG. 9 is a perspective view of the second bending limiting member of the articulated support member of FIG. 4.

As shown in FIGS. 9 and 10, each second bending limiting member 37 includes a second main body 46 and a pair of second arms 47. The second main body 46 has the shape of a substantially rectangular plate extending in the series arrangement direction X. The pair of second arms 47 are located at the opposite ends of the second main body 46 in the series arrangement direction X on the surface facing in the first direction Z1. The pair of second arms 47 protrude from the central portions of the opposite ends in the width direction Y to extend in the first direction Z1. The sections of the pair of second arms 47 closer to the proximal end than the central portions in the height direction Z (the sections toward the second direction Z2) are slightly tilted outward.

A second arcuate surface 48 is formed on the inner side of the proximal end of each of the pair of second arms 47. The second arcuate surface 48 corresponds to the outer circumferential surface of each bushing 31. When the second bending limiting member 37 is attached to the chain 25, the pair of second arms 47 hold two bushings 31 that are adjacent to each other in the series arrangement direction X with the second arcuate surfaces 48 from the opposite sides in the series arrangement direction X.

A second through-hole 49 is formed at the central portion of the second main body 46 between the pair of second arms 47. The second through-hole 49 extends through the second main body 46 in the height direction Z. The second through-hole 49 serves as a second insertion section. The opposite outer surfaces of the second bending limiting member 37 in the series arrangement direction X each include a second engaging portion 50 and a second contact portion 51. The second engaging portion 50 is T-shaped and configures the half part of the outer surface toward the second direction Z2. The second contact portion 51 is T-shaped and configures the half part of the outer surface toward the first direction Z1.

The second contact portion 51 is parallel to both the width direction Y and the height direction Z. The second engaging portion 50 is parallel to the width direction Y and is slightly tilted inward with respect to the height direction Z. The second engaging portion 50 is parallel to the first contact portion 45, and the second contact portion 51 is parallel to the first engaging portion 44.

As shown in FIG. 10, the chain bending limiting attachment 35 is attached to the chain 25 with the chain 25 placed in the straight position. In this case, the first bending limiting members 36 are attached to the chain 25 in such a manner that the pair of first arms 41 sequentially hold two bushings 31 that are adjacent to each other in the series arrangement direction X from the first direction Z1. Each first bending limiting member 36 contacts another first bending limiting member 36 that is adjacent in the series arrangement direction X. The second bending limiting members 37 are attached to the chain 25 in such a manner that the pair of second arms 47 sequentially hold two bushings 31 that are adjacent to each other in the series arrangement direction X from the second direction Z2. Each second bending limiting member 37 contacts another second bending limiting member 37 that is adjacent in the series arrangement direction X.

One of the two bushings 31 that are held by the pair of first arms 41 of one first bending limiting member 36 is held by the pair of second arms 47 of one of the two second bending limiting members 37 that are adjacent to each other in the series arrangement direction X. The other one of the two bushings 31 that are held by the pair of first arms 41 of one first bending limiting member 36 is held by the pair of second arms 47 of the other one of the two second bending limiting members 37 that are adjacent to each other in the series arrangement direction X.

One of the two bushings 31 that are held by the pair of second arms 47 of one second bending limiting member 37 is held by the pair of first arms 41 of one of the two first bending limiting members 36 that are adjacent to each other in the series arrangement direction X. The other one of the two bushings 31 that are held by the pair of second arms 47 of one second bending limiting member 37 is held by the pair of first arms 41 of the other one of the two first bending limiting members 36 that are adjacent to each other in the series arrangement direction X.

That is, the two bushings 31 held by the pair of first arms 41 of one first bending limiting member 36 and the two bushings 31 held by the pair of second arms 47 of the second bending limiting member 37 that corresponds to the above first bending limiting member 36 include one bushing 31 in common. In other words, each bushing 31 is held by one first arm 41 and one second arm 47 from the opposite sides in the series arrangement direction X.

The first through-hole 43 of one first bending limiting member 36 receives the distal end portion of one of the two second arms 47 of one of the two second bending limiting members 37 that are adjacent to each other in the series arrangement direction X and the distal end portion of one of the two second arms 47 of the other one of the second bending limiting members 37. In this case, the distal end portions of the second arms 47 inserted into the first through-hole 43 do not protrude from the first through-hole 43.

The second through-hole 49 of one second bending limiting member 37 receives the distal end portion of one of the two first arms 41 of one of the two first bending limiting members 36 that are adjacent to each other in the series arrangement direction X and the distal end portion of one of the two first arms 41 of the other one of the first bending limiting members 36. In this case, the distal end portions of the first arms 41 inserted into the second through-hole 49 do not protrude from the second through-hole 49.

As shown in FIGS. 7 and 10, the first engaging portions 44 of each first bending limiting member 36 engage with the first engaging portions 44 of other first bending limiting members 36 that are adjacent in the series arrangement direction X, so that the relative rotational range of the inner links 27 and the outer links 29 is limited. This configuration limits bending of the chain 25 in the first direction Z1.

In the present embodiment, the first bending limiting members 36 restrict the chain 25 from bending further in the first direction Z1 from the straight position. Thus, the articulated support member 13 is restricted from bending (turning) further in the first direction Z1 (upward as viewed in FIG. 10) from the straight position (the position shown in FIG. 10).

Figure 11:
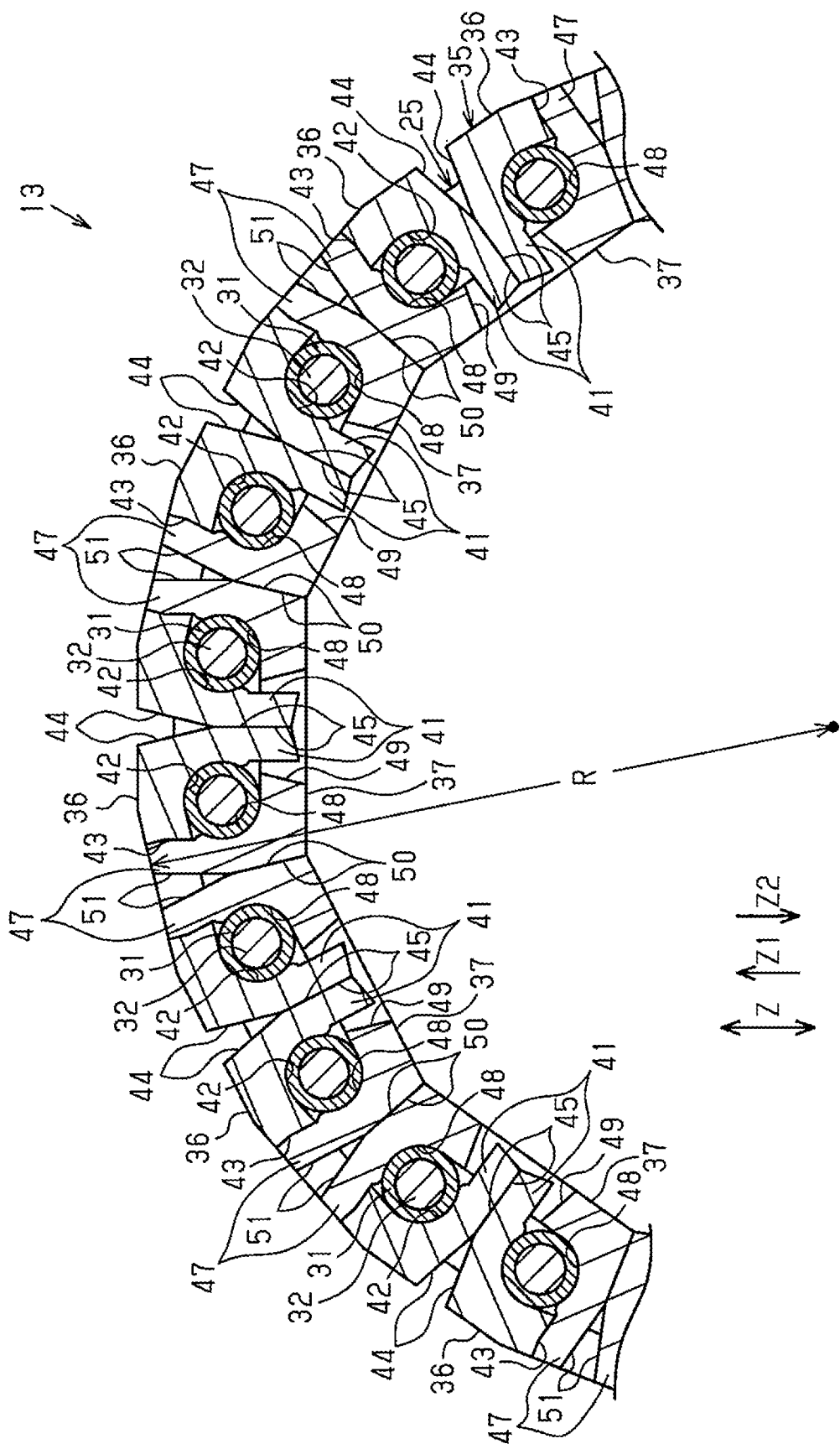
FIG. 11 is a cross-sectional view showing the bent position of the articulated support member of FIG. 4.

As shown in FIGS. 7 and 11, the second engaging portions 50 of each second bending limiting member 37 engage with the second engaging portions 50 of other second bending limiting members 37 that are adjacent in the series arrangement direction X, so that the relative rotational range of the inner links 27 and the outer links 29 is limited. This configuration limits bending of the chain 25 in the second direction Z2. In the present embodiment, the second bending limiting members 37 permit the chain 25 to bend in the second direction Z2 up to a bent position (the position illustrated in FIG. 11) at which the bending radius of the chain 25 reaches a predetermined bending radius R.

Thus, bending of the articulated support member 13 in the second direction Z2 (downward in FIG. 11) is restricted within a range up to the predetermined bending radius R. That is, since the articulated support member 13 is restricted from bending in the second direction Z2 at the predetermined bending radius R, the articulated support member 13 cannot be bent to a bending radius that is less than the predetermined bending radius R.

In other words, as shown in FIGS. 1 and 3, when the long object guide device 11 is secured to the equipment 20 at the fixed end and secured to the movable member 21 at the movable end, the minimum bending radius of the articulated support member 13 is set in such a manner that the bending radius of the curved section 11a formed between the fixed end and the movable end of the long object guide device 11 does not become less than the predetermined bending radius.

Additionally, the section of the long object guide device 11 that is located between the curved section 11a and the movable end and extended substantially horizontally in the air is subjected to the sagging force caused by its own weight. However, the articulated support members 13 in this section of the long object guide device 11 resist bending in the sagging direction since the articulated support members 13 are configured so as not to bend from the straight position in the direction opposite to the direction in which the articulated support members 13 are permitted to bend. The two articulated support members 13 are arranged in the two first tubular members 12a on the opposite edges of the long object guide device 11 in such a manner that the two articulated support members 13 are permitted to bend in the same direction.

An operation of the long object guide device 11 will now be described.

As shown in FIGS. 1 and 3, each articulated support member 13 is inserted into one of the two first tubular members 12a, which are located at the opposite edges in the width direction of the long object guide device 11. The two articulated support members 13 are arranged in such a manner that they can bend in the same direction. When the long object guide device 11 is attached to the equipment 20 shown in FIG. 3, the first fixation members 14a and the second fixation members 14b are fixed to the attachment surface 22 and the movable member 21, respectively, in such a manner that the side toward which the articulated support members 13 are permitted to bend is on the same side as the inner circumference of the curved section 11a.

When the movable member 21 reciprocates in one direction (the sideward direction as viewed in FIG. 3), the articulated support members 13 support and guide the covered wires 15 through the first and second tubular members 12a, 12b. The bending radius of the curved section 11a is maintained to be greater than or equal to the predetermined bending radius R. The section of the long object guide device 11 between the curved section 11a and the second fixation members 14b is subjected to the force in the sagging direction caused by its own weight. The sagging direction coincides with the direction in which the articulated support members 13 are restricted from bending from the straight position. This reduces the extent of sagging of the long object guide device 11.

When the articulated support member 13 reciprocates in accordance with the reciprocating movement of the movable member 21, the position of the articulated support member 13 repeatedly changes between the straight position (the position shown in FIG. 10) and the bent position (the position shown in FIG. 11). As shown in FIG. 10, when the articulated support member 13 is located at the straight position, the first engaging portions 44 of the first bending limiting members 36 that are adjacent to each other in the series arrangement direction X are engaged, and the second contact portions 51 of the second bending limiting members 37 that are adjacent to each other in the series arrangement direction X are engaged.

As shown in FIG. 11, when the articulated support member 13 is located at the bent position, the second engaging portions 50 of the second bending limiting members 37 that are adjacent to each other in the series arrangement direction X are engaged, and the first contact portions 45 of the first bending limiting members 36 that are adjacent to each other in the series arrangement direction X are engaged. At this time, the second arms 47 of the second bending limiting members 37 contact the inner surface of the first through-holes 43 of the first bending limiting members 36. The contact of the second arms 47 against the inner surface of the first through-holes 43 assists restricting the articulated support member 13 from being bent beyond the bent position and inhibits the second bending limiting members 37 from falling off the chain 25.

In this manner, the chain 25 is restricted from bending in the height direction Z by only attaching the chain bending limiting attachment 35 (the first bending limiting members 36 and the second bending limiting members 37) to the typical chain 25. Thus, the chain 25 to which the chain bending limiting attachment 35 is attached is used as the articulated support member 13 of the long object guide device 11 in a suitable manner.

Multiple types of the first bending limiting members 36 in which the angles of the first engaging portions 44 differ from each other and multiple types of the second bending limiting members 37 in which the angles of the second engaging portions 50 differ from each other may be prepared in advance. In this case, the bending limit of the chain 25 can be easily changed by only replacing the first bending limiting members 36 and the second bending limiting members 37. This increases the versatility of the chain 25. In this case, the first bending limiting members 36 and the second bending limiting members 37 may be separately replaced. This configuration allows the bending limit of the chain 25 toward the first direction Z1 and the bending limit of the chain 25 toward the second direction Z2 to be easily changed separately.

In order to attach the first bending limiting members 36 and the second bending limiting members 37 to the chain 25, it is only required to place the pair of first arms 41 of each first bending limiting member 36 and the pair of second arms 47 of each second bending limiting member 37 over two bushings 31 that are adjacent to each other in the series arrangement direction X and to press each first bending limiting member 36 and each second bending limiting member 37 onto the chain 25 with fingers. In order to detach the first bending limiting members 36 and the second bending limiting members 37 from the chain 25, the first bending limiting members 36 and the second bending limiting members 37 may be held with fingers and pulled out from the chain 25, or a thin rod may be used to pry out the first bending limiting members 36 and the second bending limiting members 37 from the chain 25.

The above-described first embodiment achieves the following advantages.

(1) The first bending limiting members 36 and the second bending limiting members 37, which configure the chain bending limiting attachment 35, are detachably attached to the chain 25. Thus, when multiple types of the first bending limiting members 36 in which the angles of the first engaging portions 44 differ from each other and multiple types of the second bending limiting members 37 in which the angles of the second engaging portions 50 differ from each other are prepared in advance, the bending limit of the chain 25 can be easily changed by only replacing the first bending limiting members 36 and the second bending limiting members 37. This increases the versatility of the chain 25. In this case, the bending limit of the chain 25 in the first direction Z1 and the bending limit of the chain 25 in the second direction Z2 can be easily changed separately by replacing the first bending limiting members 36 and the second bending limiting members 37 separately.

(2) The first bending limiting members 36 and the second bending limiting members 37, which configure the chain bending limiting attachment 35, include the pair of first arms 41 and the pair of second arms 47, respectively. The pair of first arms 41 and the pair of second arms 47 hold two bushings 31 that are adjacent to each other in the series arrangement direction X when the first bending limiting member 36 and the second bending limiting member 37 are attached to the chain 25. Thus, the first bending limiting members 36 and the second bending limiting members 37 can be easily attached to the chain 25 in a stable manner.

(3) In the chain bending limiting attachment 35, the two bushings 31 that are held by the pair of first alias 41 of one first bending limiting member 36 and the two bushings 31 that are held by the pair of second arms 47 of the second bending limiting member 37 corresponding to the above first bending limiting member 36 include one bushing 31 in common. Thus, a greater number of the first bending limiting members 36 and the second bending limiting members 37 can be attached to the chain 25.

(4) Each first bending limiting member 36 includes the first through-hole 43, which is formed between the pair of first arms 41. The first through-hole 43 receives one of the two second arms 47 of one of the two second bending limiting members 37 that are adjacent to each other in the series arrangement direction X and one of the two second arms 47 of the other one of the two second bending limiting members 37. Each second bending limiting member 37 includes the second through-hole 49, which is formed between the pair of second arms 47. The second through-hole 49 receives one of the two first arms 41 of one of the two first bending limiting members 36 that are adjacent to each other in the series arrangement direction X and one of the two first arms 41 of the other one of the two first bending limiting members 36. This ensures sufficient lengths of the first arms 41 of the first bending limiting members 36 and the second arms 47 of the second bending limiting members 37. This configuration ensures a sufficient holding force of the first arms 41 and the second arms 47 with respect to the bushings 31.

(5) In the chain bending limiting attachment 35, the first bending limiting members 36 restrict the chain 25 from bending further in the first direction Z1 from the straight position, and the second bending limiting members 37 permit the chain 25 to bend in the second direction Z2 until the bending radius of the chain 25 reaches the predetermined bending radius R. One end of the chain 25 is secured to the attachment surface 22, and the other end of the chain 25 is secured to the movable member 21, which is located above the attachment surface 22, with the chain 25 forming the curved section 11a. When the movable member 21 is used in such a manner that the movable member 21 reciprocates in the horizontal direction, the above configuration stabilizes the path of the chain 25 that reciprocates in accordance with the reciprocating movement of the movable member 21.

(6) The first bending limiting members 36 and the second bending limiting members 37 of the chain bending limiting attachment 35 can be easily attached to the chain 25 by only manually fitting the pair of first arms 41 and the pair of second arms 47 to the bushings 31 without the need for tools.

Second Embodiment

A chain bending limiting attachment according to a second embodiment will now be described with reference to the drawings, centering on differences between the second embodiment and the first embodiment. The description for the configuration common to the first embodiment will be omitted. Like or the same reference numerals are given to those components that are like or the same as the corresponding components of the first embodiment.

Figure 12:
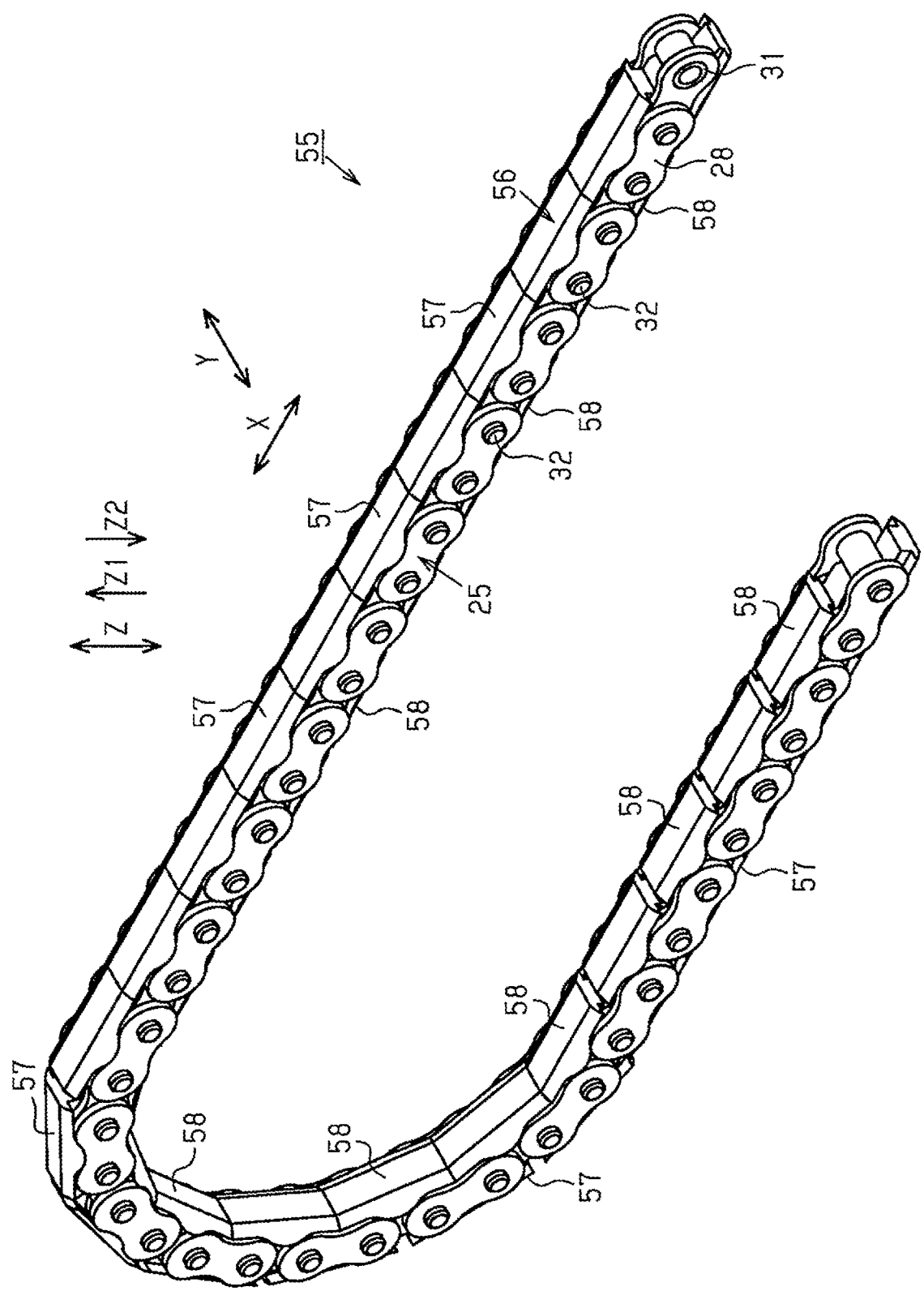
FIG. 12 is a perspective view of an articulated support member of a long object guide device according to a second embodiment.

As shown in FIG. 12, in the second embodiment, the articulated support member 13 of the long object guide device 11 according to the first embodiment is modified to an articulated support member 55. That is, the chain bending limiting attachment 35 is modified to a chain bending limiting attachment 56. The articulated support member 55 includes the chain 25 and the chain bending limiting attachment 56, which is made of synthetic plastic and is attached to the chain 25 to limit bending of the chain 25.

Figure 15:
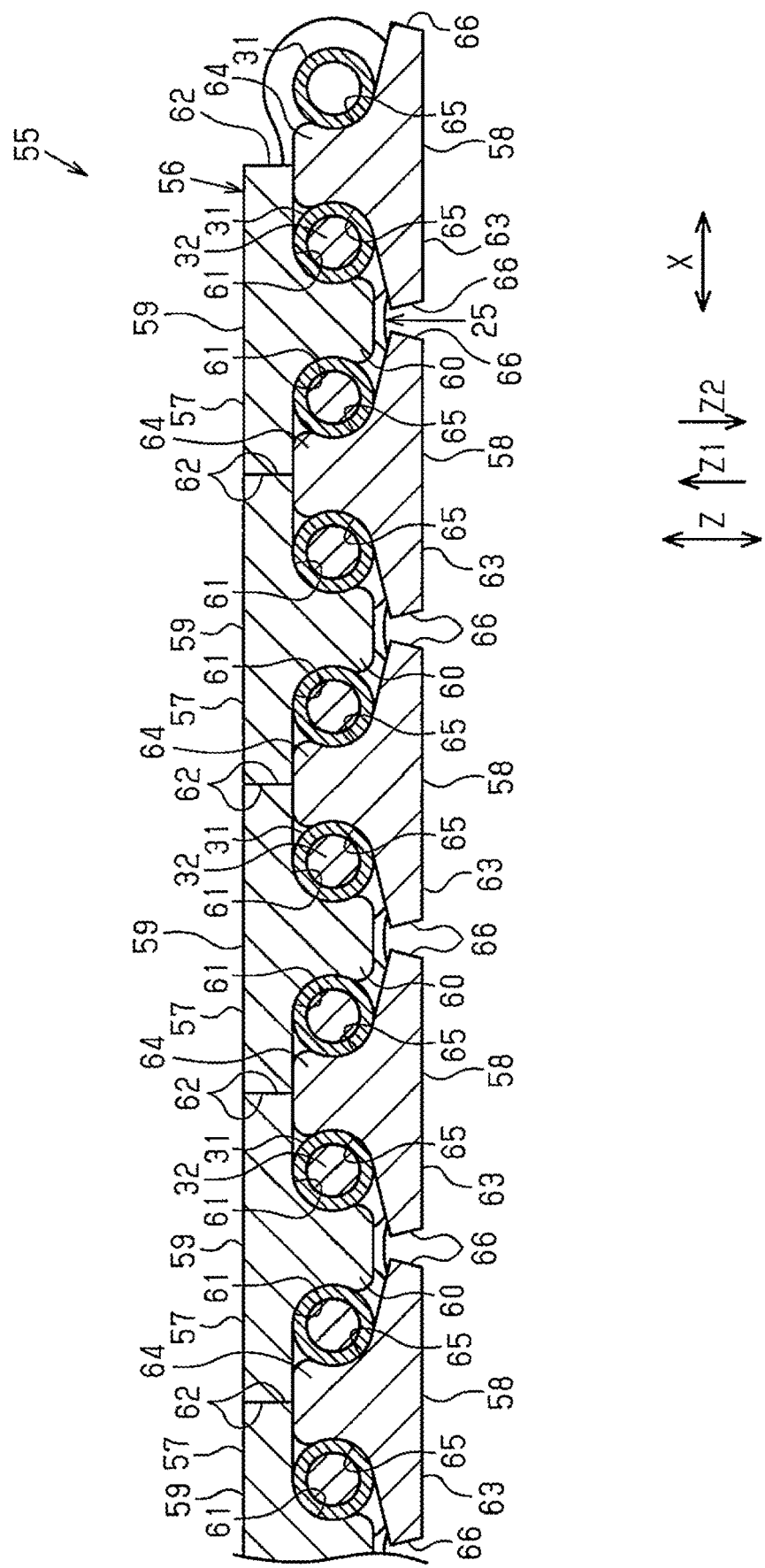
FIG. 15 is a cross-sectional view showing the straight position of the articulated support member of FIG. 12.

As shown in FIGS. 12 and 15, the chain bending limiting attachment 56 includes first bending limiting members 57 and second bending limiting members 58. The first bending limiting members 57 and the second bending limiting members 58 are detachably attached to the chain 25 to be arranged in the series arrangement direction X of the chain 25. The section of the chain 25 that extends straight is referred to as a straight section. Each first bending limiting member 57 is attached to the straight section of the chain 25 on the side facing in the first direction Z1 of the height direction Z (upward in FIG. 15). Each second bending limiting member 58 is attached to the straight section of the chain 25 on the side facing in the second direction Z2, which is opposite to the first direction Z1 (downward in FIG. 15).

Figure 13:
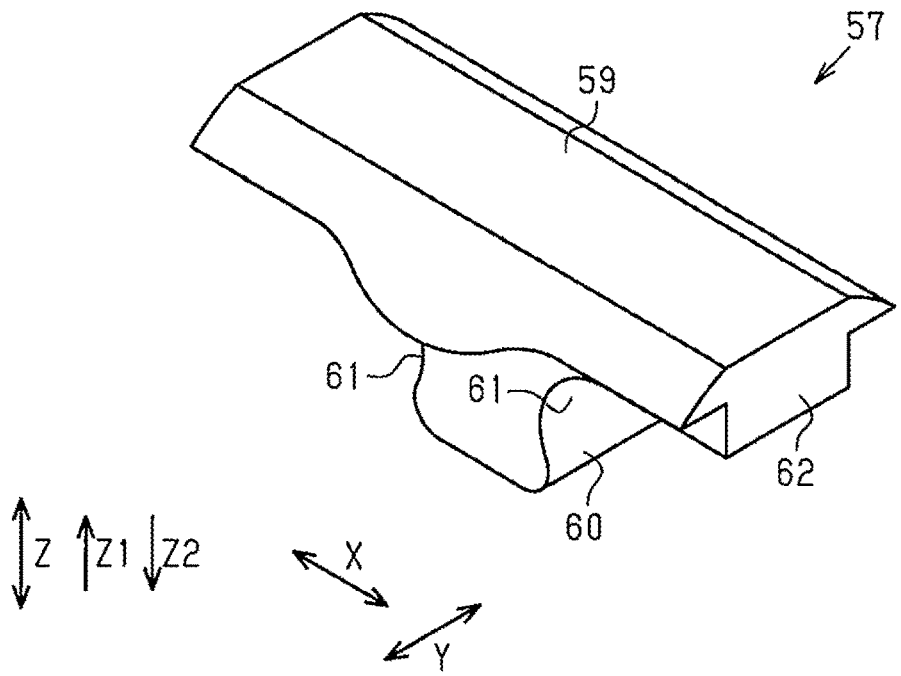
FIG. 13 is a perspective view of the first bending limiting member of the articulated support member of FIG. 12.

As shown in FIGS. 13 and 15, each first bending limiting member 57 includes a first main body 59 and a first fitting portion 60. The first main body 59 has the shape of a substantially rectangular plate extending in the series arrangement direction X. The first fitting portion 60 is located at the central portion of the surface of the first main body 59 facing in the second direction Z2 and protrudes in the second direction Z2. That is, the first bending limiting member 57 is substantially T-shaped as viewed from the width direction Y. The first fitting portion 60 includes first arcuate surfaces 61 on the opposite sides of the proximal end in the series arrangement direction X. The first arcuate surfaces 61 correspond to the outer circumferential surfaces of the bushings 31.

When each first bending limiting member 57 is attached to the chain 25, the first arcuate surfaces 61 of the first fitting portion 60 are fitted to two bushings 31 that are adjacent to each other in the series arrangement direction X. That is, the first arcuate surfaces 61 of the first fitting portion 60 are held between the two bushings 31 that are adjacent to each other in the series arrangement direction X. The opposite side surfaces of the first main body 59 of each first bending limiting member 57 in the series arrangement direction X configure T-shaped first engaging portions 62. The first engaging portions 62 are parallel to both the width direction Y and the height direction Z.

Figure 14:
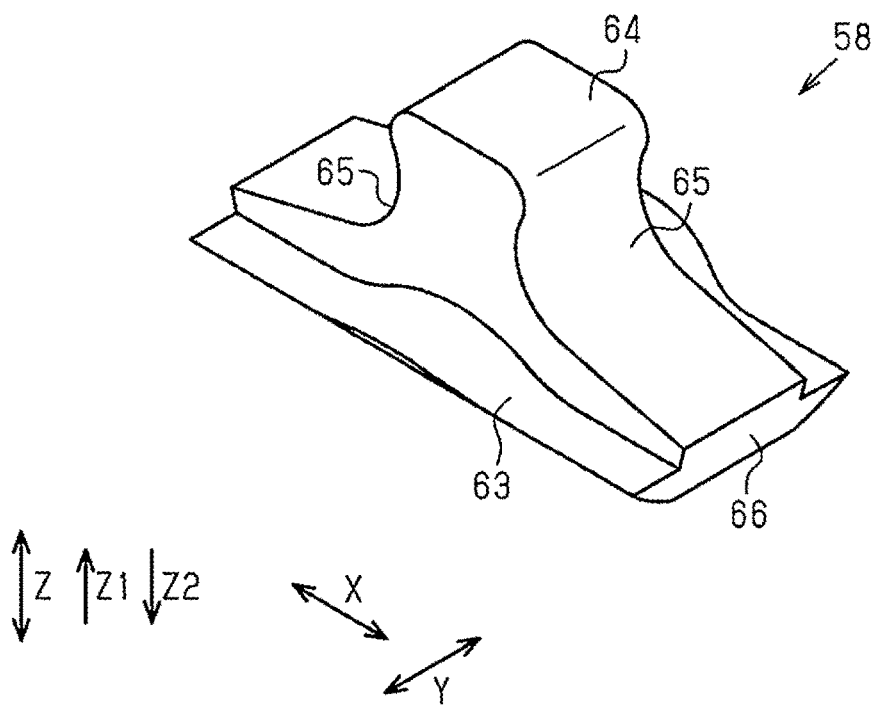
FIG. 14 is a perspective view of the second bending limiting member of the articulated support member of FIG. 12.

As shown in FIGS. 14 and 15, each second bending limiting member 58 includes a second main body 63 and a second fitting portion 64. The second main body 63 has the shape of a substantially rectangular plate extending in the series arrangement direction X. The second fitting portion 64 is located at the central portion of the surface of the second main body 63 facing in the first direction Z1 and protrudes in the first direction Z1. That is, the second bending limiting member 58 is substantially T-shaped as viewed from the width direction Y. The second fitting portion 64 includes second arcuate surfaces 65 on the opposite sides of the proximal end in the series arrangement direction X. The second arcuate surfaces 65 correspond to the outer circumferential surfaces of the bushings 31.

When each second bending limiting member 58 is attached to the chain 25, the second fitting portion 64 is fitted between two bushings 31 that are adjacent to each other in the series arrangement direction X at the second arcuate surfaces 65. That is, the second fitting portion 64 is held between two bushings 31 that are adjacent to each other in the series arrangement direction X at the second arcuate surfaces 65.

The opposite side surfaces of the second main body 63 of each second bending limiting member 58 in the series arrangement direction X configure T-shaped second engaging portions 66. The second engaging portions 66 are parallel to the width direction Y and are slightly inclined with respect to the height direction Z. More specifically, the second engaging portions 66 are inclined in such a manner that the width of the second main body 63 in the series arrangement direction X is increased toward the second fitting portion 64.

As shown in FIG. 15, the chain bending limiting attachment 56 is attached to the chain 25 with the chain 25 placed in the straight position. In this case, each first bending limiting member 57 contacts other first bending limiting members 57 that are adjacent in the series arrangement direction X with the first fitting portion 60 fitted between two bushings 31 that are adjacent to each other in the series arrangement direction X from the first direction Z1.

The second fitting portion 64 of each second bending limiting member 58 is fitted between two bushings 31 that are adjacent to each other in the series arrangement direction X from the second direction Z2. However, each second bending limiting member 58 does not contact other second bending limiting members 58 that are adjacent in the series arrangement direction X. The first fitting portions 60 of the first bending limiting members 57 and the second fitting portions 64 of the second bending limiting members 58 are alternately fitted between the bushings 31 of the chain 25 in the series arrangement direction X.

As shown in FIG. 15, the first engaging portions 62 of each first bending limiting member 57 engage with the first engaging portions 62 of other first bending limiting members 57 that are adjacent in the series arrangement direction X. This limits the relative rotational range of the inner links 27 (see FIG. 7) and the outer links 29 (see FIG. 7) and thus limits bending of the chain 25 in the first direction Z1.

In the present embodiment, the first bending limiting members 57 restrict the chain 25 from bending further in the first direction Z1 from the straight position. Thus, the articulated support member 55 is restricted from bending (turning) further in the first direction Z1 (upward in FIG. 15) from the straight position (the position shown in FIG. 15).

When the articulated support member 55 is at the straight position, the distal end surface of the first fitting portion 60 of each first bending limiting member 57 does not contact the second main bodies 63 of the second bending limiting members 58. However, the distal end surface of the second fitting portion 64 of each second bending limiting member 58 contacts the first main bodies 59 of the first bending limiting members 57.

Figure 16:
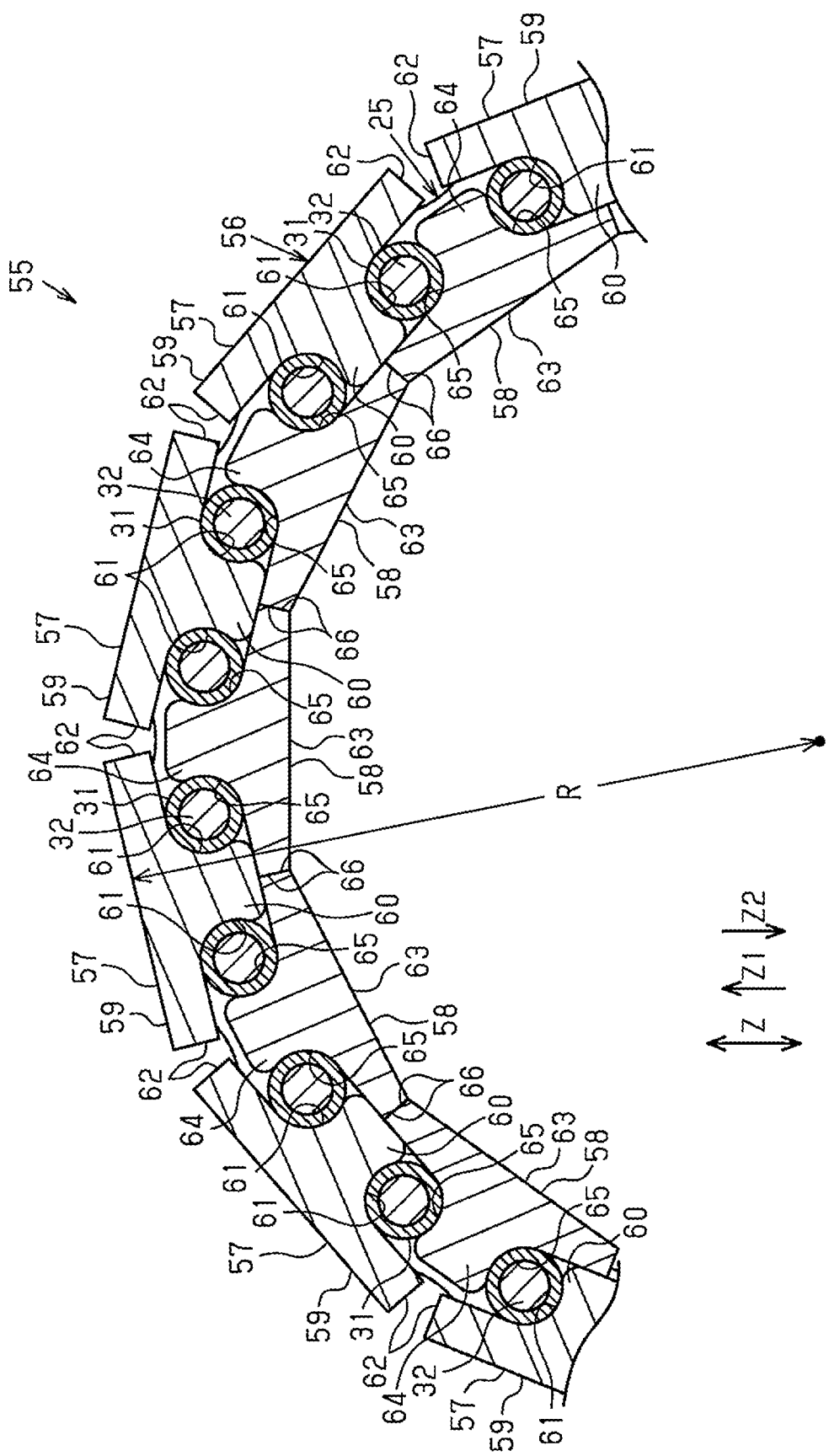
FIG. 16 is a cross-sectional view showing the bent position of the articulated support member of FIG. 12.

As shown in FIG. 16, the second engaging portions 66 of each second bending limiting member 58 engage with the second engaging portions 66 of other second bending limiting members 58 that are adjacent in the series arrangement direction X. This limits the relative rotational range of the inner links 27 (see FIG. 7) and the outer links 29 (see FIG. 7) and thus limits bending of the chain 25 in the second direction Z2. In the present embodiment, the second bending limiting members 58 permit the chain 25 to bend in the second direction Z2 up to the bent position (the position shown in FIG. 16) at which the bending radius of the chain 25 reaches the predetermined bending radius R.

Thus, bending of the articulated support member 55 in the second direction Z2 (downward in FIG. 16) is restricted within a range up to the predetermined bending radius R. That is, since the articulated support member 55 is restricted from bending in the second direction Z2 at the predetermined bending radius R, the articulated support member 55 cannot be bent to a bending radius that is less than the predetermined bending radius R.

When the articulated support member 55 is at the bent position, the distal end surface of the first fitting portion 60 of each first bending limiting member 57 contacts the second main bodies 63 of the second bending limiting members 58. However, the distal end surface of the second fitting portion 64 of each second bending limiting member 58 does not contact the first main bodies 59 of the first bending limiting members 57. In this case, the first bending limiting members 57 do not contact other first bending limiting members 57 that are adjacent in the series arrangement direction X.

The above-described second embodiment achieves the following advantages in addition to the above-described advantages (1) and (5).

(7) The first bending limiting members 57 and the second bending limiting members 58, which configure the chain bending limiting attachment 56, include the first fitting portion 60 and the second fitting portion 64, respectively. The first fitting portion 60 and the second fitting portion 64 are each fitted between two bushings 31 that are adjacent to each other in the series arrangement direction X when the first bending limiting member 57 and the second bending limiting member 58 are attached to the chain 25. Thus, the first bending limiting members 57 and the second bending limiting members 58 can be easily attached to the chain 25 in a stable manner.

(8) The first bending limiting members 57 and the second bending limiting members 58 of the chain bending limiting attachment 56 can be easily attached to the chain 25 by only manually fitting the first fitting portions 60 and the second fitting portions 64 between the bushings 31 without the need for tools.

Third Embodiment

A chain bending limiting attachment according to a third embodiment will now be described with reference to the drawings, centering on differences between the third embodiment and the first embodiment. The description for the configuration common to the first embodiment will be omitted. Like or the same reference numerals are given to those components that are like or the same as the corresponding components of the first embodiment.

Figure 17:
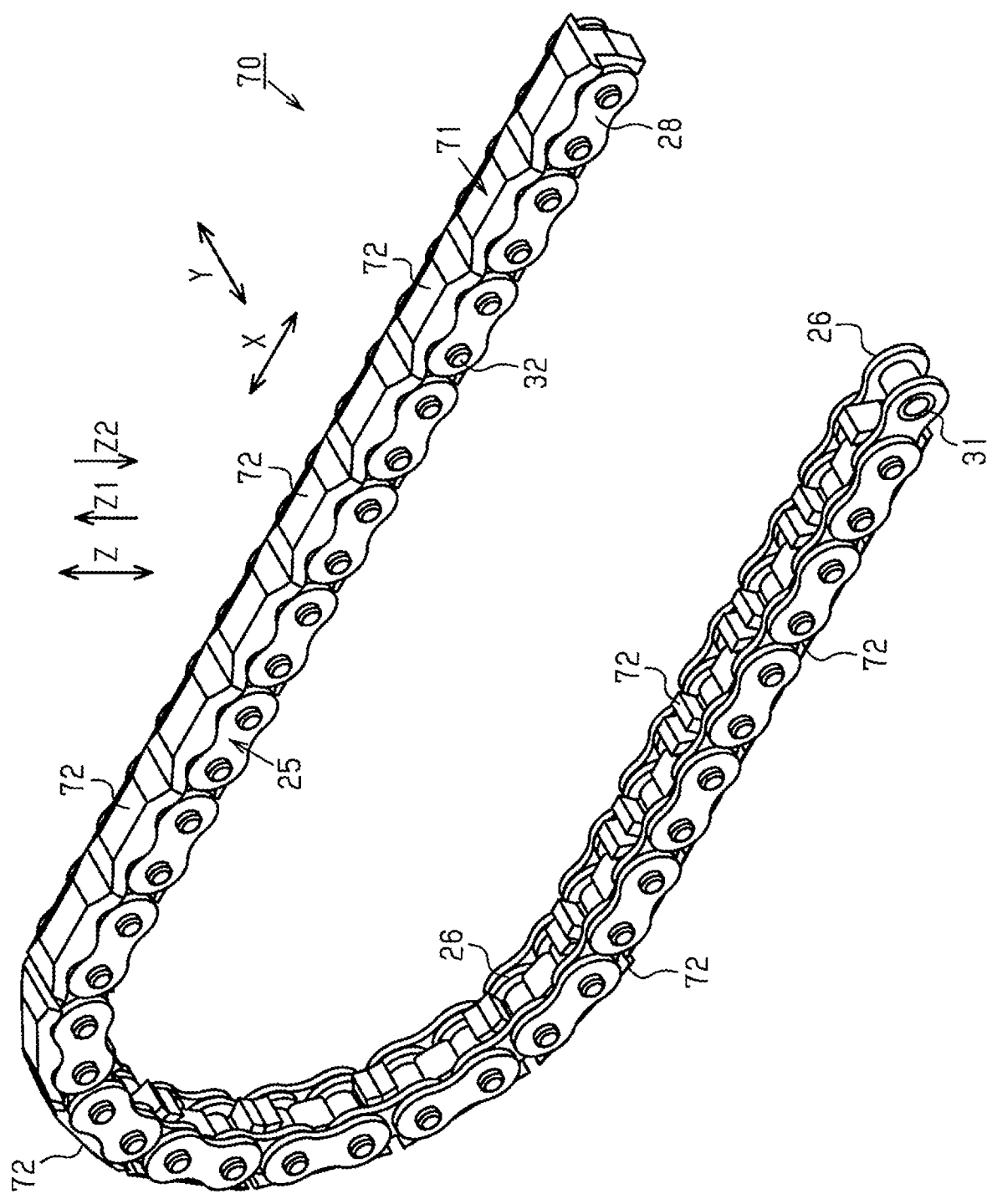
FIG. 17 is a perspective view of an articulated support member of a long object guide device according to a third embodiment.

As shown in FIG. 17, in the third embodiment, the articulated support member 13 of the long object guide device 11 according to the first embodiment is modified to an articulated support member 70. That is, the chain bending limiting attachment 35 is modified to a chain bending limiting attachment 71. The articulated support member 70 includes the chain 25 and the chain bending limiting attachment 71, which is made of synthetic plastic and is attached to the chain 25 to limit bending of the chain 25.

Figure 19:
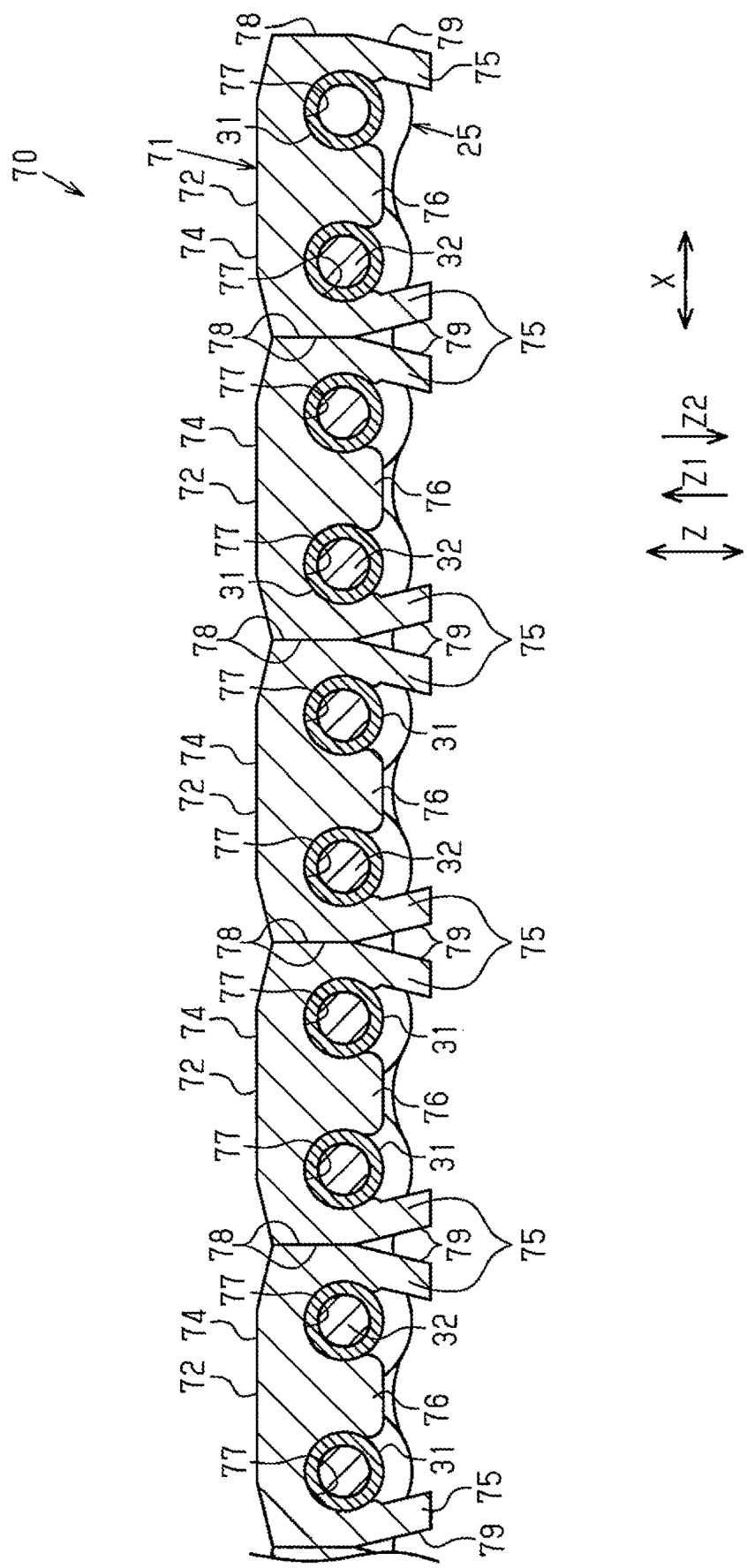
FIG. 19 is a cross-sectional view showing the straight position of the articulated support member of FIG. 17.

As shown in FIGS. 17 and 19, the chain bending limiting attachment 71 includes bending limiting members 72, which are detachably attached to the chain 25 to be arranged in the series arrangement direction X of the chain 25. The section of the chain 25 that extends straight is referred to as a straight section. Each bending limiting member 72 is attached to the straight section of the chain 25 on the side facing in the first direction Z1 of the height direction Z (upward in FIG. 17).

Figure 18:
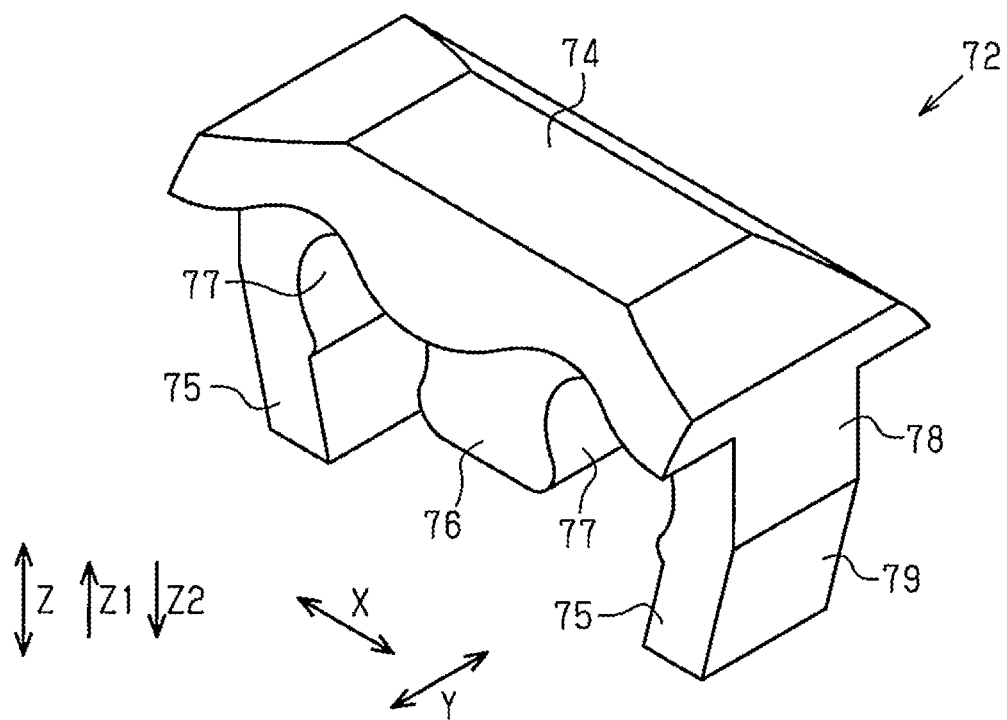
FIG. 18 is a perspective view of the bending limiting member of the articulated support member of FIG. 17.

As shown in FIGS. 18 and 19, each bending limiting member 72 includes a main body 74 and a pair of arms 75. The main body 74 has the shape of a substantially rectangular plate extending in the series arrangement direction X. The pair of arms 75 are located at the opposite ends of the main body 74 in the series arrangement direction X on the surface facing in the second direction Z2. The pair of arms 75 protrude from the central portions of the opposite ends in the width direction Y to extend in the second direction Z2. The sections of the pair of arms 75 closer to the distal ends than the central portions in the height direction Z (the section toward the second direction Z2) are slightly tilted inward.

A fitting portion 76 is provided at the central portion of the surface of the main body 74 facing in the second direction Z2 to protrude in the second direction Z2. The length of the fitting portion 76 in the height direction Z is set to be shorter than the length of the pair of arms 75. Each bending limiting member 72 includes arcuate surfaces 77. The arcuate surfaces 77 extend from the opposite sides of the fitting portion 76 in the series arrangement direction X to the proximal ends of the pair of arms 75. The arcuate surfaces 77 correspond to the outer circumferential surfaces of the bushings 31.

When each bending limiting member 72 is attached to the chain 25, the pair of arms 75 hold two bushings 31 that are adjacent to each other in the series arrangement direction X with the arcuate surfaces 77 from the opposite sides in the series arrangement direction X, and the fitting portion 76 is fitted between the two bushings 31 that are adjacent to each other in the series arrangement direction X at the arcuate surfaces 77.

The opposite outer surfaces of the bending limiting member 72 in the series arrangement direction X each include a first engaging portion 78 and a second engaging portion 79. The first engaging portion 78 is T-shaped and configures the half part of the outer surface toward the first direction Z1. The second engaging portion 79 has a rectangular shape and configures the half part of the outer surface toward the second direction Z2. The first engaging portion 78 is parallel to both the width direction Y and the height direction Z. The second engaging portion 79 is parallel to the width direction Y and is slightly tilted inward with respect to the height direction Z.

As shown in FIG. 19, the chain bending limiting attachment 71 is attached to the chain 25 with the chain 25 being placed in the straight position. In this case, the bending limiting members 72 are arranged in such a manner that each pair of arms 75 sequentially hold two bushings 31 that are adjacent to each other in the series arrangement direction X from the first direction Z1, and each fitting portion 76 is fitted between the two bushings 31, which are held between the associated pair of arms 75. Each bending limiting member 72 contacts other bending limiting members 72 that are adjacent in the series arrangement direction X.

As shown in FIG. 19, the first engaging portions 78 of each bending limiting member 72 engage with the first engaging portions 78 of other bending limiting members 72 that are adjacent in the series arrangement direction X. This limits the relative rotational range of the inner links 27 (see FIG. 7) and the outer links 29 (see FIG. 7) and thus limits bending of the chain 25 in the first direction Z1. In the present embodiment, the bending limiting members 72 restrict the chain 25 from bending further in the first direction Z1 from the straight position.

Thus, the articulated support member 70 is restricted from bending (turning) further in the first direction Z1 (upward in FIG. 19) from the straight position (the position shown in FIG. 19). When the articulated support member 70 is in the straight position, the second engaging portions 79 of each bending limiting member 72 do not contact the second engaging portions 79 of other bending limiting members 72 that are adjacent in the series arrangement direction X.

Figure 20:
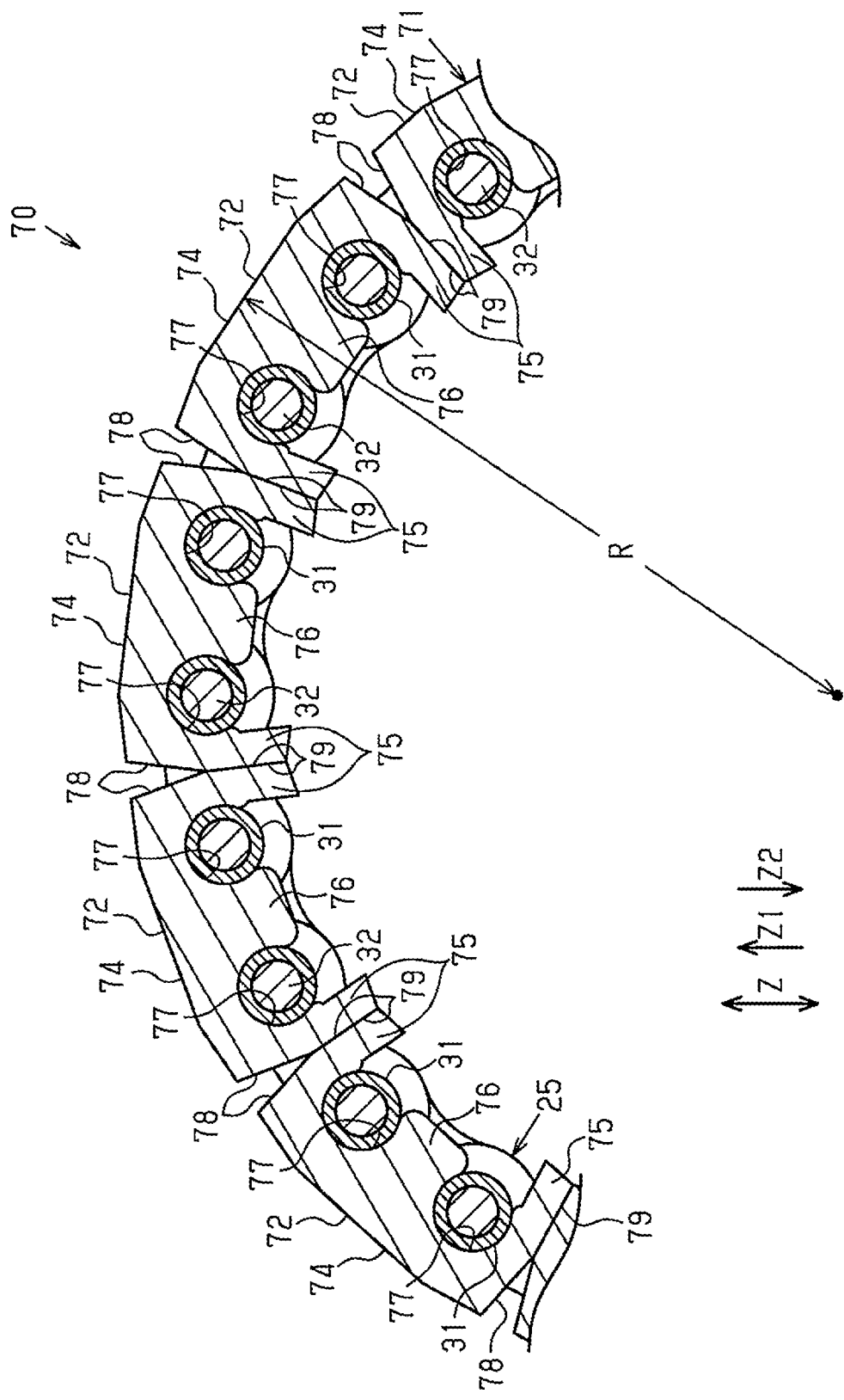
FIG. 20 is a cross-sectional view showing the bent position of the articulated support member of FIG. 17.

As shown in FIG. 20, the second engaging portions 79 of each bending limiting member 72 engage with the second engaging portions 79 of other bending limiting members 72 that are adjacent in the series arrangement direction X. This limits the relative rotational range of the inner links 27 (see FIG. 7) and the outer links 29 (see FIG. 7) and thus limits bending of the chain 25 in the second direction Z2. In the present embodiment, the bending limiting members 72 permit the chain 25 to bend in the second direction Z2 up to the bent position (the position shown in FIG. 20) at which the bending radius of the chain 25 reaches the predetermined bending radius R.

Thus, bending of the articulated support member 70 in the second direction Z2 (downward in FIG. 20) is restricted within a range up to the predetermined bending radius R. That is, since the articulated support member 70 is restricted from bending in the second direction Z2 at the predetermined bending radius R, the articulated support member 70 cannot be bent to a bending radius that is less than the predetermined bending radius R. When the articulated support member 70 is at the bent position, the first engaging portions 78 of each bending limiting member 72 do not contact the first engaging portions 78 of other bending limiting members 72 that are adjacent in the series arrangement direction X.

The above-described third embodiment achieves the following advantages in addition to the above-described advantages (1) and (5).

(9) The chain bending limiting attachment 71 is configured by one type of the bending limiting members 72. Thus, compared with the chain bending limiting attachment 35 of the first embodiment and the chain bending limiting attachment 56 of the second embodiment, the number of the types of the components constituting the chain bending limiting attachment is reduced.

(10) In the chain bending limiting attachment 71, each bending limiting member 72 can be easily attached to the chain 25 by only manually fitting the pair of arms 75 and the fitting portion 76 to the bushings 31 without the need for tools.

Modifications

The above-described embodiments may be modified as follows.

Figure 21:
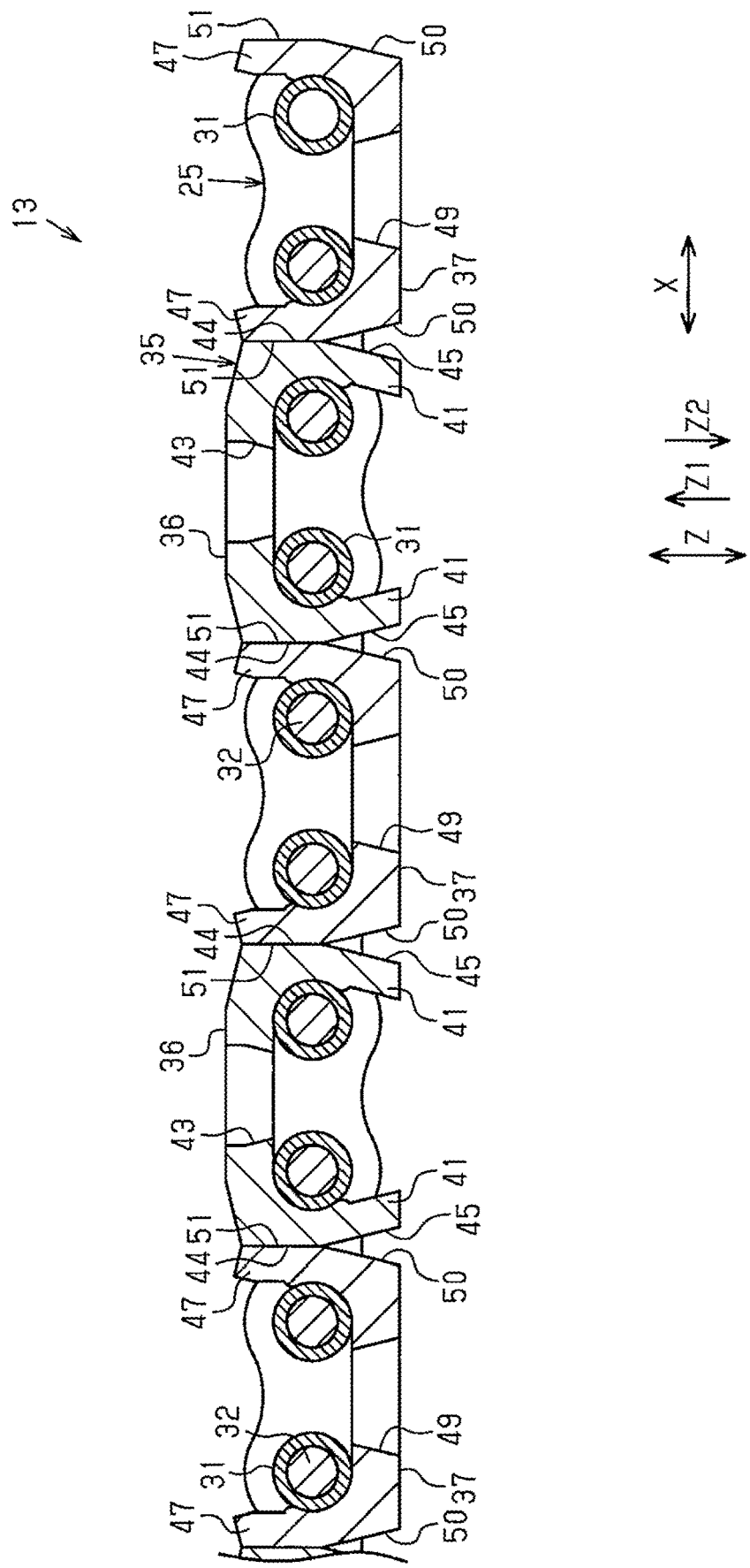
FIG. 21 is a cross-sectional view showing the straight position of an articulated support member according to a modification.

As shown in FIG. 21, in the chain bending limiting attachment 35 of the first embodiment, the first bending limiting members 36 and the second bending limiting members 37 may be alternately attached to the chain 25 in the series arrangement direction X. In this case, the first bending limiting members 36 and the second bending limiting members 37 hold the bushings 31 arranged in the series arrangement direction X two by two without overlapping. When the articulated support member 13 is at the straight position, the first engaging portions 44 of each first bending limiting member 36 engage with the second contact portions 51 of the second bending limiting members 37 that are adjacent in the series arrangement direction X, and the first contact portions 45 of each first bending limiting member 36 are separate from the second engaging portions 50 of the second bending limiting members 37 that are adjacent in the series arrangement direction X. When the articulated support member 13 is at the bent position, as shown in FIG. 22, the first contact portions 45 of each first bending limiting member 36 engage with the second engaging portions 50 of the adjacent second bending limiting members 37, and the first engaging portions 44 of each first bending limiting member 36 are separate from the second contact portions 51 of the adjacent second bending limiting members 37.

Figure 22:
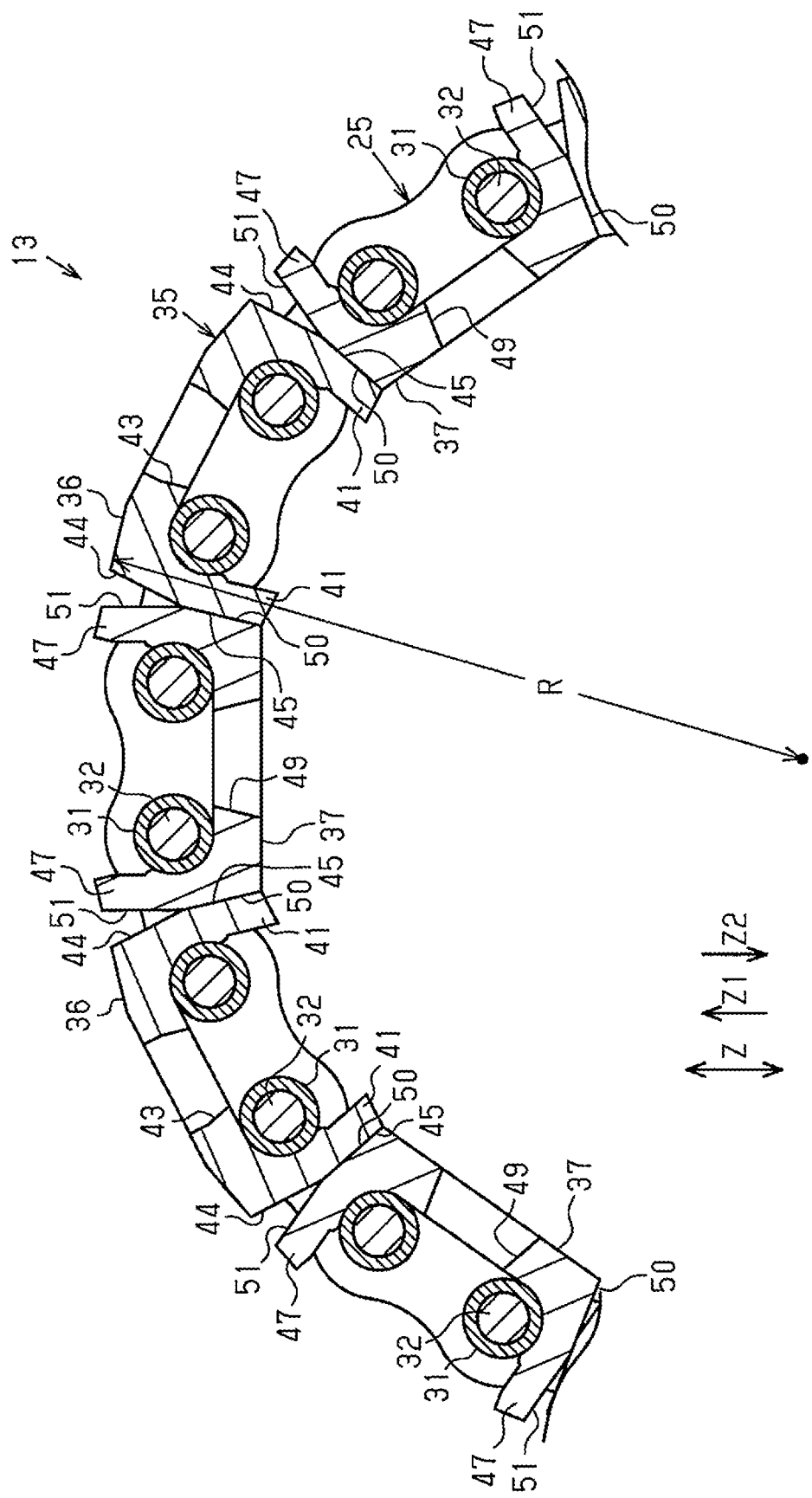
FIG. 22 is a cross-sectional view showing the bent position of the articulated support member of FIG. 21.

In the articulated support member 13 according to the modification shown in FIGS. 21 and 22, at least one of the first through-hole 43 of each first bending limiting member 36 and the second through-hole 49 of each second bending limiting member 37 may be omitted.

Instead of the first through-hole 43 of each first bending limiting member 36 and the second through-hole 49 of each second bending limiting member 37, recesses may be employed as the first insertion section and the second insertion section. The recesses may be famed in the first main body 40 and the second main body 46 not to extend through the first main body 40 and the second main body 46. In this case, the second arms 47 of the second bending limiting members 37 are inserted into the recesses of the first bending limiting members 36, and the first arms 41 of the first bending limiting members 36 are inserted into the recesses of the second bending limiting members 37.

The first bending limiting members 36, 57 and the bending limiting member 72 may be configured to permit the chain 25 to bend further in the first direction Z1 from the straight position.

The fitting portion 76 may be omitted from the bending limiting member 72 of the third embodiment.

The chain bending limiting attachments 35, 56, and 71 may be made of metal.

The chain bending limiting attachments 35, 56, and 71 may be attached to an offset chain, which uses offset links in which the distance between the two facing links at one end differs from the distance between the two facing links at the other end.

The chain bending limiting attachments 35, 56, and 71 may be attached to a roller chain, in which the bushings 31 of the chain 25 are inserted into rollers, and the rollers are rotationally supported by the bushings 31.

In addition to the covered wires 15 for supplying power to the movable member 21, the long object may be, for example, optical fiber cables for transmitting signals to the movable member 21 or hoses for supplying gas (such as air) or liquid (such as water and oil) to the movable member 21.

DESCRIPTION OF THE REFERENCE NUMERALS

25 . . . Chain, 27 . . . Inner Links, Which Serve As Links, 29 . . . Outer Links, Which Serve As Links, 31 . . . Bushings, 32 . . . Pins, 35, 56, 71 . . . Chain Bending Limiting Attachment, 36, 57 . . . First Bending Limiting Members (Bending Limiting Members), 37, 58 . . . Second Bending Limiting Members (Bending Limiting Members), 41 . . .

First Arms, 43 . . . First Through-Hole, Which Serves As First Insertion Section, 44, 62, 78 . . . First Engaging Portions, 47 . . . Second Arms, 49 . . . Second Through-Hole, Which Serves As Second Insertion Section, 50, 66, 79 . . . Second Engaging Portions, 60 . . . First Fitting Portion, 64 . . . Second Fitting Portion, 72 . . . Bending Limiting Members, R . . . Predetermined Bending Radius, X . . . Series Arrangement Direction, Z1 . . . First Axis, Z2 . . . Second Axis.

The invention claimed is:

1. A chain bending limiting attachment attached to a chain, which is formed by rotationally coupling a plurality of links in series, the links include a plurality of pairs of links rotationally coupled to each other, wherein the chain bending limiting attachment limits a rotational range of each pair of links with each other to limit bending of the chain, the chain bending limiting attachment comprising a plurality of bending limiting members detachably attached to the chain to be arranged in a series arrangement direction of the chain, wherein the bending limiting members include first bending limiting members each including a first engaging portion, and second bending limiting members each including a second engaging portion, when the chain bends in a first direction in a direction intersecting with the series arrangement direction, the first engaging portion of each first bending limiting member engages with the first engaging portion of another first bending limiting member that is adjacent in the series arrangement direction so that the first bending limiting members limit bending of the chain in the first direction, and when the chain bends in a first direction, which is opposite to the first direction, the second engaging portion of each second bending limiting member engages with the second engaging portion of another second bending limiting member that is adjacent in the series arrangement direction so that the second bending limiting members limit bending of the chain in the second direction.

2. The chain bending limiting attachment according to claim 1, wherein the chain includes the pairs of links, a plurality of pins, and a plurality of tubular bushings, wherein the pins and the bushings rotationally couple the two links in each pair with each other, each pin being inserted into the corresponding one of the bushings, each first bending limiting member includes a pair of first arms, which holds two bushings that are adjacent to each other in the series arrangement direction from opposite sides in the series arrangement direction when the first bending limiting member is attached to the chain, and each second bending limiting member includes a pair of second arms, which holds two bushings that are adjacent to each other in the series arrangement direction from opposite sides in the series arrangement direction when the second bending limiting member is attached to the chain.

3. The chain bending limiting attachment according to claim 2, wherein the two bushings that are held between the pair of first arms of one of the first bending limiting members and the two bushings that are held between the pair of second arms of the corresponding one of the second bending limiting members include one bushing in common.

4. The chain bending limiting attachment according to claim 3, wherein each first bending limiting member includes a first insertion section, which is formed between the pair of first arms, wherein the first insertion section receives one of the two second arms of one of the two second bending limiting members that are adjacent to each other in the series arrangement direction and one of the two second arms of the other one of the second bending limiting members, and each second bending limiting member includes a second insertion section, which is formed between the pair of second arms, wherein the second insertion section receives one of the two first arms of one of the two first bending limiting members that are adjacent to each other in the series arrangement direction and one of the two first arms of the other one of the first bending limiting members.

5. The chain bending limiting attachment according to claim 1, wherein the chain includes the pairs of links, a plurality of pins, and a plurality of tubular bushings, wherein the pins and the bushings rotationally couple the two links in each pair with each other, each pin being inserted into the corresponding one of the bushings, each first bending limiting member includes a first fitting portion, which is fitted between two bushings that are adjacent to each other in the series arrangement direction when the first bending limiting member is attached to the chain, and each second bending limiting member includes a second fitting portion, which is fitted between two bushings that are adjacent to each other in the series arrangement direction when the second bending limiting member is attached to the chain.

6. The chain bending limiting attachment according to claim 1, wherein the first bending limiting members restrict the chain from bending further in the first direction from a straight position, and the second bending limiting members permit the chain to bend in the second direction until a bending radius of the chain reaches a predetermined bending radius.

* * * * *